United States Patent [19]

Kahlman et al.

[11] Patent Number: 5,469,462
[45] Date of Patent: Nov. 21, 1995

[54] RECEIVING ARRANGEMENT INCLUDING A VARIABLE EQUALIZER WHICH VARIABLE EQUALIZER IS CONTROLLED ON THE BASIS OF ONE OR MORE SIGNAL PORTIONS PRODUCED BY THE VARIABLE EQUALIZER

[75] Inventors: Josephus A. H. M. Kahlman; Albert M. A. Rijckaert, both of Eindhoven, Netherlands

[73] Assignee: U.S. Philips Corporation, New York, N.Y.

[21] Appl. No.: 102,077

[22] Filed: Aug. 4, 1993

[30] Foreign Application Priority Data

Aug. 6, 1992 [EP] European Pat. Off. ............ 92202428

[51] Int. Cl.$^6$ .............................. G11B 5/35; H03H 7/30; H03H 7/40; H03K 5/159
[52] U.S. Cl. .................... 375/232; 360/65; 364/724.2; 371/43
[58] Field of Search ................... 360/65, 40, 32; 375/11, 12, 13, 14, 16; 364/724.2; 333/28 R; 371/43

[56] References Cited

U.S. PATENT DOCUMENTS

| | | | |
|---|---|---|---|
| 4,459,698 | 7/1984 | Yumoto et al. | 375/16 |
| 4,755,889 | 7/1988 | Schwartz | 360/32 |
| 5,136,436 | 8/1992 | Kahlman | 360/40 |
| 5,140,474 | 8/1992 | Kahlman et al. | 360/40 |
| 5,142,421 | 8/1992 | Kahlman et al. | 360/40 |
| 5,265,125 | 11/1993 | Ohta | 360/65 X |
| 5,293,401 | 3/1994 | Serfaty | 375/13 |

FOREIGN PATENT DOCUMENTS 0332079 9/1989 European Pat. Off. .
0387813 9/1990 European Pat. Off. .

*Primary Examiner*—Aristotelis Psitos
*Assistant Examiner*—Patrick Wamsley
*Attorney, Agent, or Firm*—Richard A. Weiss

[57] ABSTRACT

An arrangement for producing a digital signal from an input (e.g., analog) signal obtained from a transmission medium. The arrangement includes a variable equalizer for equalizing the input signal as regards magnitude and phase as a function of frequency to produce an equalized signal, an equalizer control signal generator for generating first and second control signals for controlling the variable equalizer and a detector for producing the digital signal from the equalized signal. The arrangement further includes a bit array selector (i.e., a bit sequence detector) for generating one or two selection signals upon detection of one or more specific bit arrays (i.e., bit sequences) in the digital signal, and a sample-and-hold unit which samples one or more portions of the equalized signal under the influence of the one or two selection signals so as to produce at least one first sample value and at least one second sample value. The first and second control signals are derived in whole or in part from arithmetical combinations of the at least one first sample value and the at least one second sample value. The variable equalizer equalizes the input signal as regards magnitude in response to the first control signal and as regards phase in response to the second control signal.

45 Claims, 23 Drawing Sheets

| | $a(t=-\tau)$ | $q(t=\tau)$ | $a(t=-\tau)+a(t=\tau)$ | $a(t=-\tau)-a(t=\tau)$ | HF eq | $D_h-D_l$ |
|---|---|---|---|---|---|---|
| positive going transition | + | + | pos | | too low | |
| | − | − | neg | | too high | |
| | + | − | | pos | | pos |
| | − | + | | neg | | neg |
| | 0 | 0 | 0 | 0 | correct | zero |
| negative going transition | + | + | pos | | too high | |
| | − | − | neg | | too low | |
| | + | − | | pos | | neg |
| | − | + | | neg | | pos |
| | 0 | 0 | 0 | 0 | correct | zero |
FIG. 3
FIG. 4a
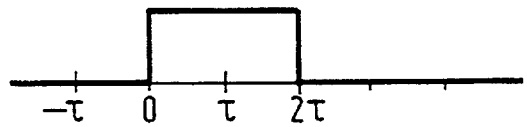
FIG. 4b
FIG. 4c
FIG. 4d
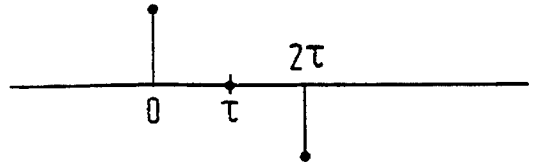

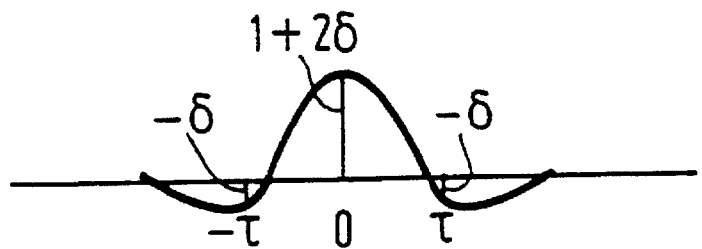
FIG. 8a
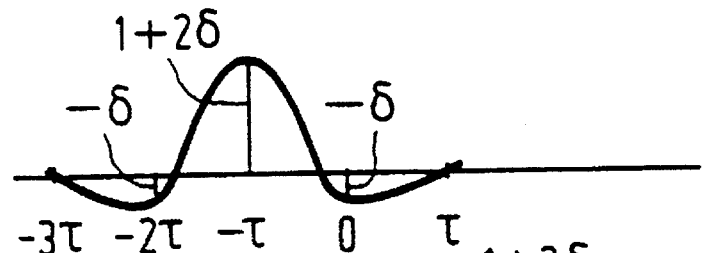
FIG. 8b
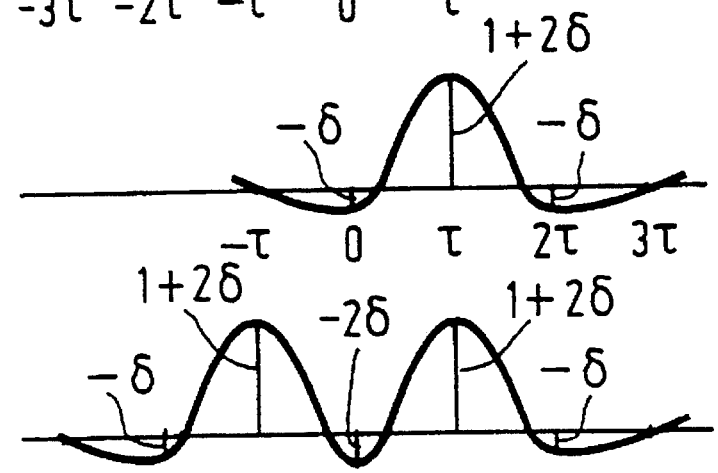
FIG. 8c
FIG. 8d
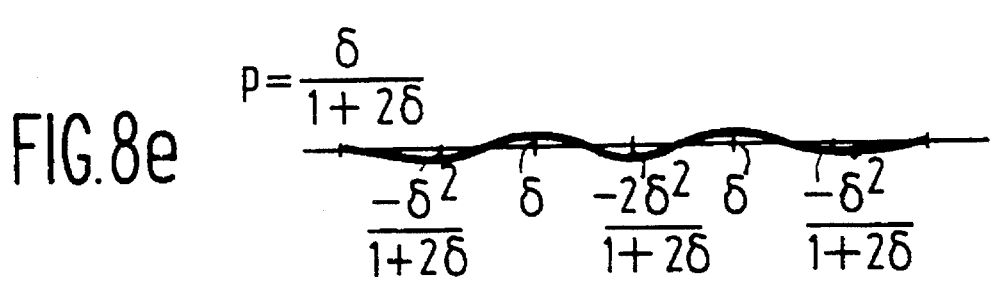
FIG. 8e
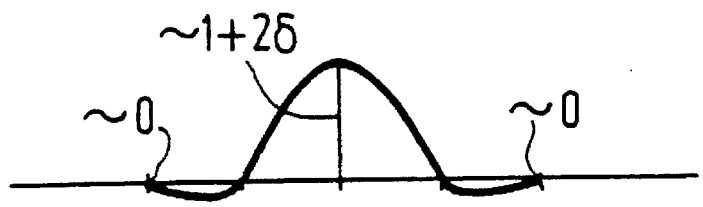
FIG. 8f

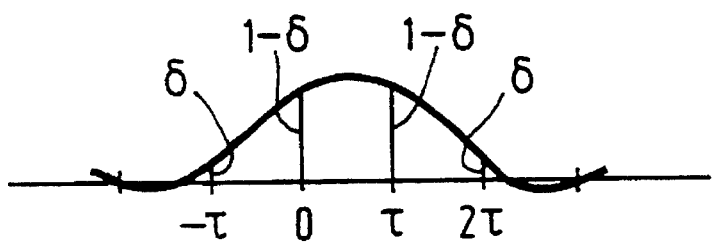
FIG. 15a
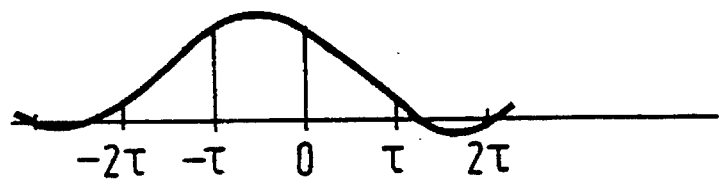
FIG. 15b
FIG. 15c
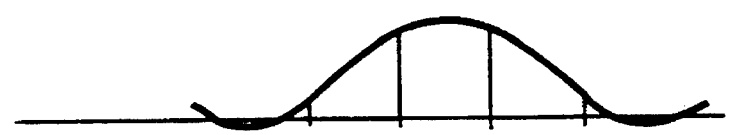
FIG. 15d
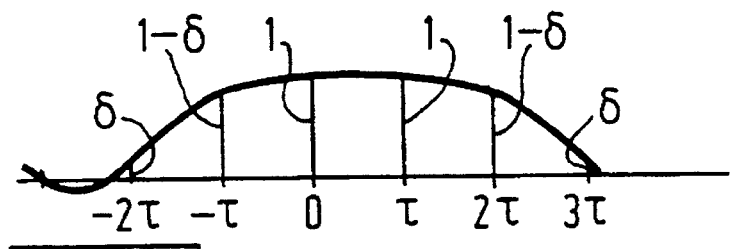
FIG. 15e
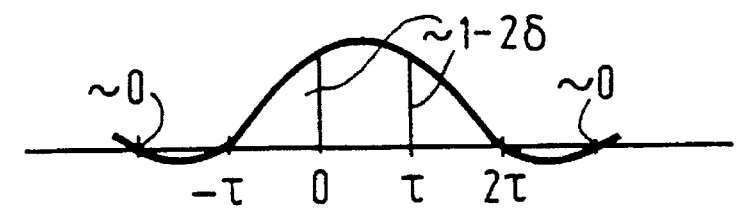
FIG. 15f

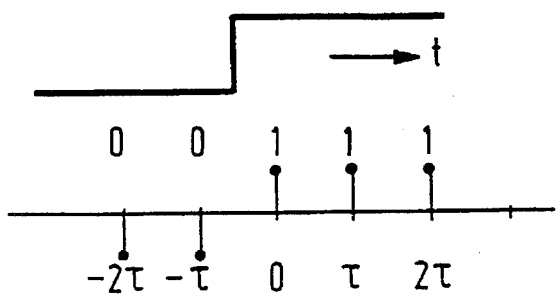
FIG. 18a
FIG. 18b
FIG. 18c
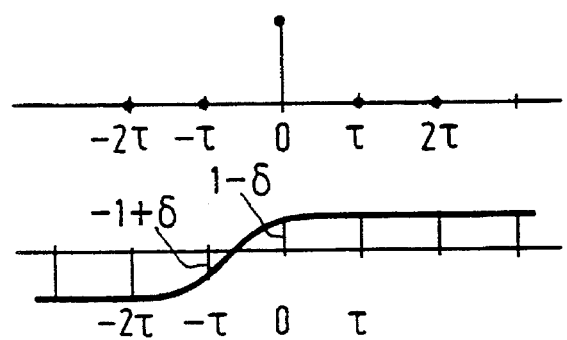
FIG. 18d
FIG. 18e
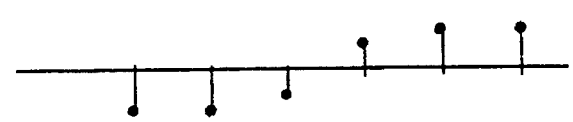
FIG. 18f
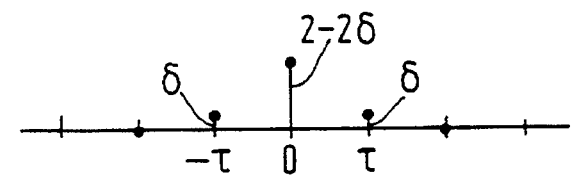
FIG. 18g
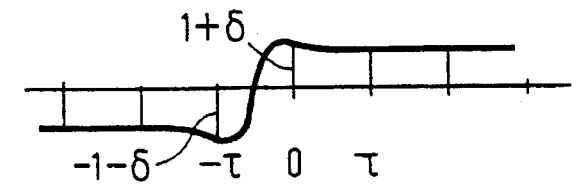
FIG. 18h
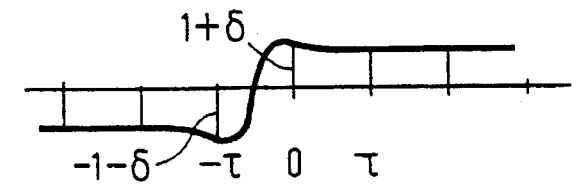
FIG. 18i
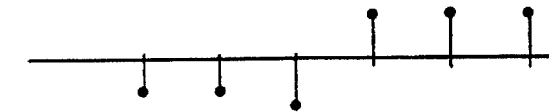
FIG. 18j
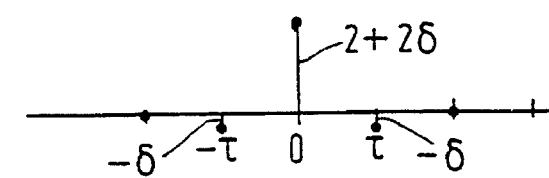

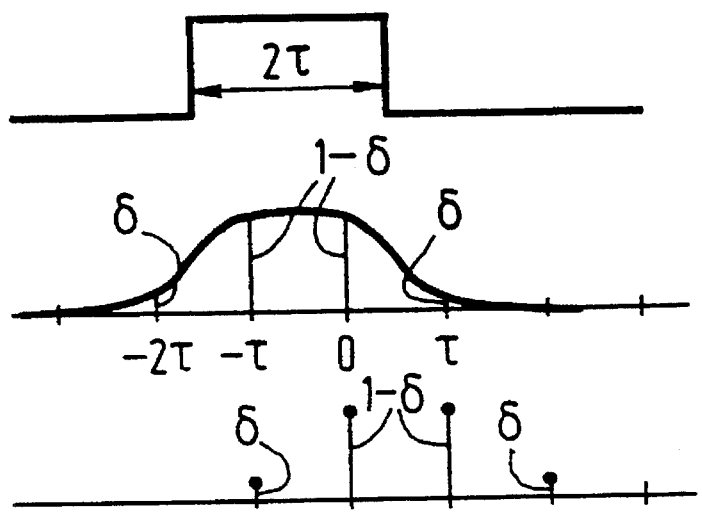
FIG. 20a
FIG. 20b
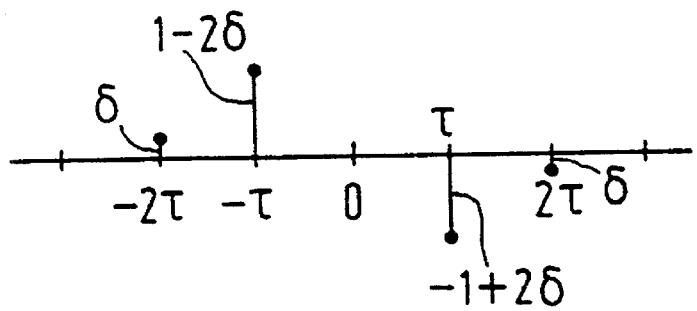
FIG. 20c
FIG. 20d $S_1 = a_2 - a_1$
$S_2 = a_4 - a_3$
$C_1 = (a_2 - a_1) + (a_4 - a_3)$
$C_2 = (a_2 - a_1) - (a_4 - a_3)/a_2 + a_3$ $S_1 = \delta$
$S_2 = \delta$
$C_1 = 2\delta$
$C_2 = 0$ $S_1 = \delta$
$S_2 = -\delta$
$C_1 = 0$
$C_2 = 2\delta$

RECEIVING ARRANGEMENT INCLUDING A VARIABLE EQUALIZER WHICH VARIABLE EQUALIZER IS CONTROLLED ON THE BASIS OF ONE OR MORE SIGNAL PORTIONS PRODUCED BY THE VARIABLE EQUALIZER

The invention relates to an arrangement for producing a digital signal from an input signal obtained from a transmission medium. Such an arrangement comprises (a) an input unit for receiving the input signal from the transmission medium, (b) a variable equalizer, having an input coupled to an output of the input unit, a control signal input for receiving a control signal and an output for supplying an equalized output signal, (c) a signal detector, having an input coupled to an output of the variable equalizer and an output for supplying a first digital signal, (d) an equalizer control signal generator having an output for supplying the control signal, which output is coupled to the control signal input of the variable equalizer; and (e) an output terminal for supplying the digital output signal, which in that arrangement is the first digital signal. Such an arrangement is known from EP 387,813 A2.

In the known arrangement equalization is realized by varying the variable equalizer filter parameters in response to the control signal supplied to the control signal input. The control signal is obtained by measuring the bit error rate in the digital signal obtained after detection. The control signal obtained has a relation to the level of the bit error rate present in the digital signal, and, as such, can be used to realize an equalization which minimizes the bit error rate.

The known arrangement has the disadvantage that sometimes an incorrect equalization is realized, resulting in a distorted output signal.

SUMMARY OF THE INVENTION

The object of the invention is to provide an arrangement which provides a more robust equalization.

The arrangement in accordance with the invention is characterized in that it comprises, in addition to the elements discussed in the opening paragraph, a bit array selector (i.e., a bit sequence detector), having an input coupled to the output of the signal detector and an output for supplying a first and a second selection signal respectively upon detection of at least one specified array of bits (i.e., bit sequence) included in the signal applied to its input. The bit array selector is adapted to select bit arrays corresponding to a signal portion in a response at the output of the variable equalizer so as to select a signal portion which is suitable for deriving from it a first and a second control signal for the variable equalizer. The arrangement further comprises a sample-and-hold unit, having an input coupled to the output of the variable equalizer, a control signal input coupled to the output of the bit array selector, and an output which is coupled to an input of the equalizer control signal generator. The sample-and-hold unit is adapted to sample and hold the signal applied to its input under the influence of the first selection signal so as to obtain at least one first sample value, to sample and hold the signal applied to its input under the influence of the second selection signal so as to obtain at least one second sample value, and to supply the first and second sample values to its output. The equalizer control signal generator unit is adapted to generate the first and the second control signals upon receipt of the first and second sample values, the first control signal relating to a first arithmetical combination of the first and the second sample values, the second control signal relating to a second arithmetical combination of the first and the second sample values and the first and the second arithmetical combinations being different from each other.

As an alternative, the arrangement in accordance with the invention is characterized in that in addition to the elements discussed in the opening paragraph it comprises a bit array selector (i.e., a bit sequence detector), having an input coupled to the output of the signal detector and an output for supplying a selection signal upon detection of a specified array of bits (i.e., a bit sequence) included in the signal applied to its input. The bit array selector is adapted to select bit arrays so as to select a signal portion in a response at the output of the variable equalizer which corresponds to a signal portion which is suitable for deriving from it a first and a second control signal for the variable equalizer. This alternative apparatus further comprises a sample-and-hold unit having an input coupled to the output of the variable equalizer, a control signal input coupled to the output of the bit array selector, and an output which is coupled to an input of the equalizer control signal generator. The sample-and-hold unit is adapted to sample and hold the signal applied to its input under the influence of the selection signal so as to obtain at least one first sample value and at least one second sample value, and to supply the first and second sample values to its output, the first and second sample values not coinciding with each other in time. The equalizer control signal generator is adapted to generate the first and second control signals upon receipt of the first and second sample values, the first control signal relating to a first arithmetical combination of the first and the second sample values and the second control signal relating to a second arithmetical combination of the first and the second sample values, the first and the second arithmetical combinations being different from each other.

The invention is based on the following recognition. Isolated transitions in a signal transmitted via a transmission medium, such as via a magnetic record carrier, result in specified responses in the analog signal received from the transmission medium. Such specified responses can be impulse responses or step responses. Impulse responses result when carrying out a Nyquist 1 or a partial response class 4 detection. Step responses are the result of a full response detection.

An impulse response has zero signal values at certain sampling instants adjacing the sampling instant(s) where the response is at a maximum, in the case that the equalizer settings of the equalizer incorporated in the arrangement are set for zero intersymbol interference. More specifically, the impulse response has a zero signal amplitude at the two sampling instants directly before and directly after the sampling instant(s) where the response is at a maximum.

A step response has a zero crossing exactly in the middle between two sampling instants and has amplitudes +A for sampling instants prior to the zero crossing and amplitudes −A at the sampling instants following the zero crossing, again in a situation where the equalizer settings are set for zero intersymbol interference.

It has been recognized that an incorrect variable equalizer setting has its major influence on the signal values at the sampling instants that are the closest to the maximum in the impulse response or the closest to the zero crossing in the step response. More specifically, the signal value at the sampling instants adjacent the sampling instant of maximum amplitude in the impulse response become non-zero in response to varying equalizer settings. The signal value at the sampling instants adjacent the zero crossing in the step response become unequal to +A and −A respectively. It has further been recognized that by measuring the signal values of the analog signal at at least the specific two sampling instants, it is possible to obtain a control signal with which a variable equalizer can be controlled as regards magnitude and phase as a function of frequency. More specifically, a first control signal can be obtained by applying the first arithmetical combination of the sampling values at the at least two sampling instants, which first control signal is applied to the variable equalizer so as to control the variable equalizer as regards magnitude as a function of frequency. A second control signal can be obtained by applying the second arithmetical combination of the sampling values at the at least two sampling instants, which second control signal is applied to the variable equalizer so as to control the variable equalizer as regards phase as a function of frequency.

The method of equalization described above has the advantage that it is insensitive to varying signal amplitudes, in the sense that it controls the signal values at the sampling instant(s) adjacent the sampling instant at which the impulse response is at a maximum, which signal values ought to be zero, to a zero amplitude. In the case of a full response detection, it forces the signal values prior to the zero crossing to +A and the signal values following the zero crossing to −A.

Determining the two sampling instants is done by detecting specific arrays of bits in the two- or three valued digital signal that has been derived from the analog signal read from the track. The specific bit arrays that should be detected are dependent of the detection method used, such as Nyquist 1 detection, partial response class 4 (PR4) detection or full response detection.

BRIEF DESCRIPTION OF THE DRAWINGS

The invention will be explained in more detail with reference to the embodiments described in the following figures, in which

FIG. 3 shows a table which explains the behavior of a signal read out in response to a step transition of the write current on the tape as a function of various equalizer settings;

FIGS. 4a–4d show the influence of an erroneous equalizer setting on the signal read out in response to two step transitions that are spaced 2τ away from each other;

FIGS. 7a–7f, 8a–8f, 9a–9f and 10a–10f show the variable equalizing function carried out on a number of signal responses;

FIGS. 15a–15f and 16a–16f show the variable equalizing function carried out on a number of signal responses;

FIGS. 18a–18j and 19a–19g show a full response detection of an isolated positive going step transition in the write current;

FIGS. 20a–20d shows the influence of an erroneous equalizer setting on the signal read out in response to two step transitions that are spaced 2τ away from each other;

DESCRIPTION OF THE PREFERRED EMBODIMENT

In order to explain the basis of the invention, reference is made to the Nyquist 1 or PR1 (partial response class 1) detection of a positive going step transition in the write current of a record carrier.

Figure 1:
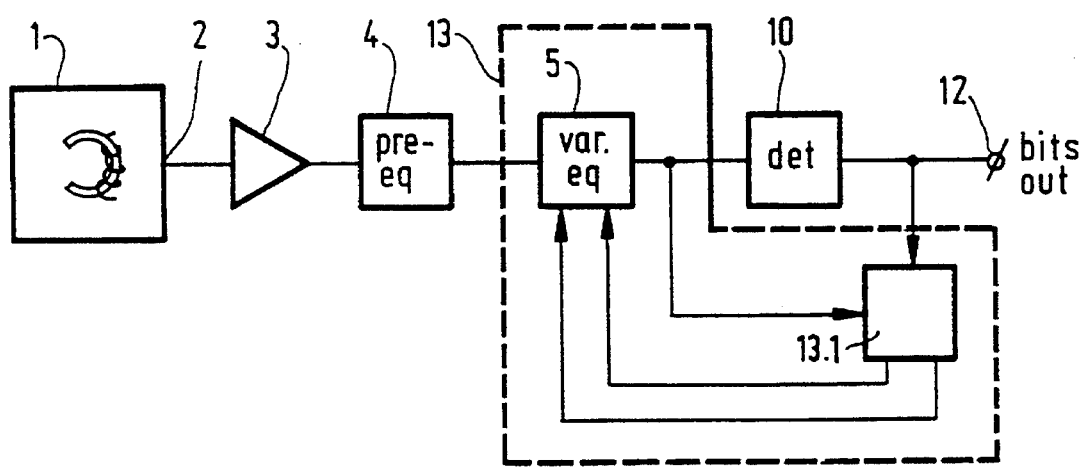
FIG. 1 shows a reproducing arrangement for carrying out a Nyquist 1 detection.

FIG. 1 shows an arrangement for producing a digital signal from a magnetic record carrier in accordance with the Nyquist 1 detection. Signals read from the record carrier by means of the read head 1 are amplified in a pre-amplifier 3 and pre-equalized in a pre-equalizer 4. The pre-equalizer 4 realizes a HF emphasis such that it shapes the signal read out as a function of frequency so as to enable a Nyquist 1 detection on the signal in a detector 10. The pre-equalizer 4 compensates for losses occurring in the recording channel. These other losses occur as a result of the properties of the tape that is used, and the quality of the tape-head contact.

As a result of the detection in the bit detector 10, an array of detected bits appear at the output terminal 12.

Figure 2A:
FIGS. 2a–2j shows a Nyquist 1 detection of an isolated positive going step transition of a write current on tape.

FIG. 2a shows the positive going transition in the write current as a function of time.

Figure 2B:
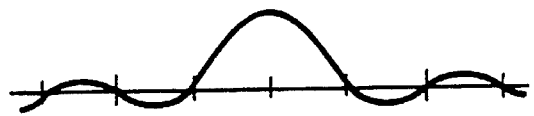
Figure 2C:
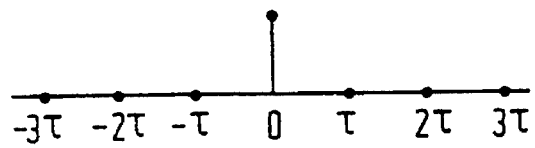

The transition of FIG. 2a is recorded on the record carrier and is read out by the differentiating head 1, and shaped in magnitude and phase according to the Nyquist 1 criterion in pre-equalizer 4, which results, in case of an ideal situation, in a response as given in FIG. 2b and 2c. The signal given in FIG. 2b is in fact the ideal analog response signal present at the output of the pre-equalizer 4. The signal given in FIG.

2c is a sampled signal that has been derived in the detector 10 from the signal of FIG. 2b by taking samples of the signal of FIG. 2b at the sampling instants . . . , $-3\tau$, $-2\tau$, $-\tau$, 0, $\tau$, $2\tau$, $3\tau$, . . . The sampled signal obtained is in the form of an isolated pulse at the time instant t=0. The samples at the other time instants have a zero amplitude. This sampled signal results in a digital signal at the output of the detector 10 that can be expressed by the following array of bits: ( . . . , 0, 0, 1, 0, 0, . . . ).

The sampling instants are derived using a PLL, such that one sampling instant is mainly located at the moment of occurrence of the maximum amplitude in the response function of FIG. 2b.

Figure 2D:
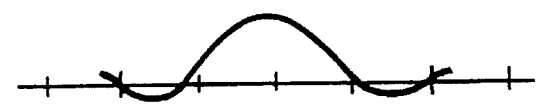
Figure 2E:
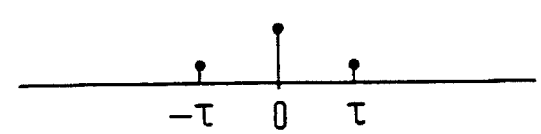

An inadequate equalization during read-out, changes the pulse width of the signal of FIG. 2b, which results in samples in the vicinity of the isolated pulse deviating from zero. FIG. 2d and 2e show this effect, when the low(er) frequencies in the output signal of the pre-equalizer 4 are over-emphasized compared to the high(er) frequencies in the said output signal. The isolated Nyquist 1 shaped pulse is too wide, which results in a positive amount of intersymbol interference at the time instants t=$-\tau$ and t=$\tau$. The sampled signal can now be expressed as ( . . . , ~0, $\delta$, 1$-2\delta$, $\delta$, ~0, . . .).

Figure 2F:
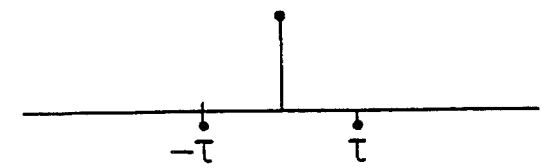

FIG. 2f shows a situation where the transmission in the transmission path up till the output of the pre-equalizer 4 is such that high(er) frequencies in the transmitted signal are over-emphasized compared to the low(er) frequencies. In that case, a negative amount of intersymbol interference is present as samples that occur at the time instants t=$-\tau$ and t=$\tau$, and which have a negative amplitude. The sampled signal can now be expressed as ( . . . , ~0, $-\delta$, 1+$2\delta$, $-\delta$, ~0, . . . ).

Figure 2G:
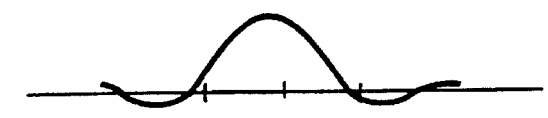
Figure 2H:
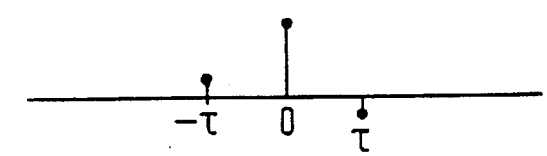

FIG. 2g shows the effect on the signal read out if the transmission in the transmission path up till the output of the pre-equalizer 4 exhibits a delay that is higher for high(er) frequencies than for low(er) frequencies. The result is an asymmetric response, where the inclination angle of the response curve for times larger than zero is larger than for times smaller than zero. FIG. 2h shows the corresponding sampled signal. As will be clear from this figure, a sample of positive amplitude appears at the time instant t=$-\tau$, and a sample of negative amplitude appears at the time instant t=$\tau$. The sampled signal can now be expressed as ( . . . , ~0, $\delta$, 1, $-\delta$, ~0, . . . ).

Figure 2I:
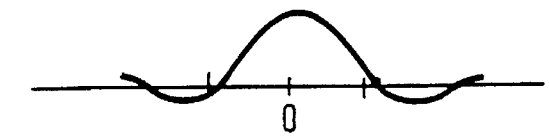
Figure 2J:
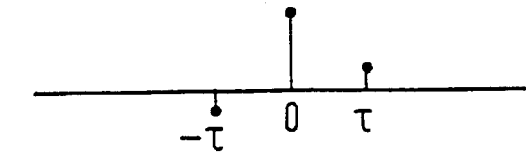

FIG. 2i shows the effect on the signal read out if the transmission in the transmission path up till the output of the pre-equalizer exhibits a delay that is lower for high(er) frequencies than for low(er) frequencies. The result is again an asymmetric response, where the inclination angle of the response curve for times smaller than zero is larger than for times larger than zero. FIG. 2j shows the corresponding sampled signal. As will be clear from this figure, a sample of negative amplitude appears at the time instant t=$-\tau$, and a sample of positive amplitude appears at the time instant t=$\tau$. The sampled signal can now be expressed as ( . . . , ~0, $-\delta$, 1, $\delta$, ~0, . . . ).

The relationship between the delay D(f) and the phase difference $\phi$(f) will be explained hereafter.

The phase difference $\phi$(f) is the difference in phase between the frequency components of the actual response signal, such as the signal of FIG. 2g or 2i, and the required response signal, such as given in FIG. 2b. The curve for the phase difference $\phi$(f) as a function of frequency can be constant, say $\phi_0$. More generally, the phase difference $\phi$(f) equals $\phi_0 - \omega T_c$, where $T_c$ is a delay which is constant for all frequencies and $\omega = 2\pi f$.

The delay $D(\omega_0)$ for a low frequency signal having a frequency $\omega_0$ is defined as $$D(\omega_0) = -\phi/\omega_o.$$

This delay thus equals $-\phi_0/\omega_0 + T_c$.

The delay $D(\omega_1)$ for a high frequency signal having a frequency $\omega_1$ thus equals $-\phi_0/\omega_1 + T_c$. The difference in delay thus equals $-\phi_0/\omega_0 + \phi_0/\omega_1$. The common delay of $T_c$ has disappeared and thus plays no relevant role.

In the case of a positive $\phi_0$, this means that the delay $D_h$ for high(er) frequencies is higher than the delay $D_1$ for low(er) frequencies.

In the case of a negative value for $\phi_0$, this means the delay $D_h$ for high(er) frequencies is lower than the delay $D_1$ for low(er) frequencies.

From the foregoing it has become clear that, in a situation where an isolated step transition in the write current occurs, the amplitudes of the samples occurring at the time instants t=$-\tau$ and t=$\tau$ during read-out, give an indication as to the deviation of the step response present at the output of the pre-equalizer 4 from the ideal step response as per the curve of FIG. 2b. So, they can be used to realize an additional equalization in a variable equalizer 5, in order to obtain the response shown in FIG. 2b at the output of the variable equalizer 5. The table given in FIG. 3 shows all the possible situations that can occur for the samples a(t=$-\tau$) and a(t=$\tau$) that directly adjoin the isolated pulse at t=0, with the conclusions that can be derived from those situations.

The HF equalization being correct, means that no additional equalization as regards magnitude needs to be carded out by the equalizer 5.

The HF equalization being too low means that an additional equalization as regards magnitude needs to be carded out in the equalizer 5, such that the signals in a low(er) frequency region of the operational frequency range are attenuated relative to the signals in a high(er) frequency region of the operational frequency range, or that the signals in the higher frequency region are amplified relative to the signals in the low(er) frequency region.

The HF equalization being too high means that an additional equalization as regards magnitude needs to be carried out in the equalizer 5, such that the signals in the low(er) frequency region are amplified relative to the signals in the high(er) frequency region, or that the signals in the high(er) frequency region are attenuated relative to the signals in the low(er) frequency region.

The difference in delay being zero means that $\phi_0$ is zero. This means that no additional equalization as regards phase need to be carried out.

If $\phi_0$ is not equal to zero, this means that an equalization as regards phase must be carried out by the variable equalizer means, such that the variable equalizer means realizes a phase response $\phi$ which equals $-\phi_0$.

A more specific description of a functioning of the variable equalizer unit 13, which includes the variable equalizer 5 and an equalizer control signal generator 13.1, will be given later, see the FIGS. 5 to 11a and 11b.

It should be noted that the pre-equalizer 4 and the variable equalizer 5 can be combined into one variable equalizer section, which realizes both the pre-equalizer characteristic and the variable equalizer characteristic.

It should further be noted that the conclusions in the table of FIG. 3 only apply for situations where subsequent transitions in the write current occur not too close to each other, viewed in time. This can be explained with reference to FIG.

4a–4d. FIG. 4a shows a situation where a positive going transition occurs at the time interval 2τ prior to the occurrence of a negative going transition. FIG. 4b shows the signal read out in response to the positive going transition, and FIG. 4c shows the signal read out in response to the negative going transition. As can be seen from those figures, the HF equalization is too low. The total response to both transitions is given as the sampled signal in FIG. 4d, assuming that the superposition principle holds for the recording channel. The signal in FIG. 4d is the sum of the signals of FIG. 4b and 4c, sampled at the time instants ..., −τ, 0, τ, 2τ, 3τ, ... As can be seen from FIG. 4d, the signal amplitude at t=τ is zero, as the positive signal amplitude at t=τ in FIG. 4b cancels the negative amplitude at t=τ in FIG. 4c. Detection of the signal amplitude at t=τ could lead to the conclusion that no intersymbol interference is present, which is in fact not the case, as has been shown in the FIGS. 4b and 4c. The situation of FIG. 4a, where the digital write current is in the form of (..., −1, 1, 1, −1, ...) is therefore less suitable for the determination of an incorrect equalization.

From the FIGS. 2e and 2h it is clear that the assumption is made that an incorrect equalization during the read-out of a positive or negative going transition has a major influence on the signal values at the direct neighboring time instants t=±τ of the time instant t=0, and that this influence can be neglected for time instants lying further away from the time instant t=0. This has been made clear in FIGS. 2e, 2f, 2h and 2j above, by equalling the amplitude of the sampled signal for the time instants 2τ and −2τ and further away from t=0 to zero. That means that the interaction between two subsequent transitions, as described with reference to FIGS. 4a–4d, is considered negligible as soon as two subsequent transitions lie a time spacing of at least 3τ apart. As this should also be the case for a directly preceding transition, it can therefore be concluded that a positive going transition can be used for determining the amount of equalization if the digital write signal has the following form (..., −1, −1, −1, 1, 1, 1, ...), or, if the sampled signal equals (..., 0, 0, 1, 0, 0, ...), in the case of an ideal situation. In the same way, a negative going transition in the write current can be used if the digital write signal equals (..., 1, 1, 1, −1, −1, −1), which realizes a sampled signal in the form of the array of samples (..., 0, 0, −1, 0, 0, ...), in the case of an ideal situation. After rectification in the detector 10, both sampled signals realize a detected bit signal in the form of (..., 0, 0, 1, 0, 0, ...) at the output 12. The two zero-valued samples at time instants ±τ, that directly adjoin the isolated pulse at time instant t=0, are used for determining the correct equalization. This means that each time an array of bits (0, 0, 1, 0, 0) in the digital read-out signal at the output 12 should be detected.

The probability of occurrence of such an array of bits is rather low, namely $2^{-5}$, assuming that the bit patterns are random. In order to increase the number of situations that can be used for determining the correct equalization, one could detect the situations where the digital read-out signal includes the following arrays of three bits (0, 0, 1) and (1, 0, 0) separately. The probability of occurrence of those arrays of bits is higher, $2^{-3}$ for each array. The central sample in the array of three samples of the sampled signal that corresponds to one of the above two arrays of three bits in the digital output signal should now be used for determining the correct equalization. The value of the central sample in the array of three samples that corresponds to the (0, 0, 1) bit array and the value of the central sample in the array of samples that corresponds to the (1, 0, 0) bit array can be used as the samples a(t=−τ) and a(t=τ) respectively in the table of FIG. 3.

It should be noted here, that the sequence with the two zeroes before or after the '1' bit is an optimum sequence. Longer sequences with more than two '0' bits before or after the '1' bit can also be used as a detection criterion. The probability of occurrence of such sequences is however lower, the longer the sequences are, so that it lasts longer before the correct setting of the variable equalizer has been obtained. Shorter sequences, such as the sequences (0,1), (0,−1), (1,0) and (−1,0), might in some circumstances also be useful as selection criterion, because they include the longer sequences given above.

A number of further embodiments of the arrangement of FIG. 1, for realizing a Nyquist 1 read-out will be further explained with reference to the FIGS. 5 to 11a and 11b inclusive.

Figure 5:
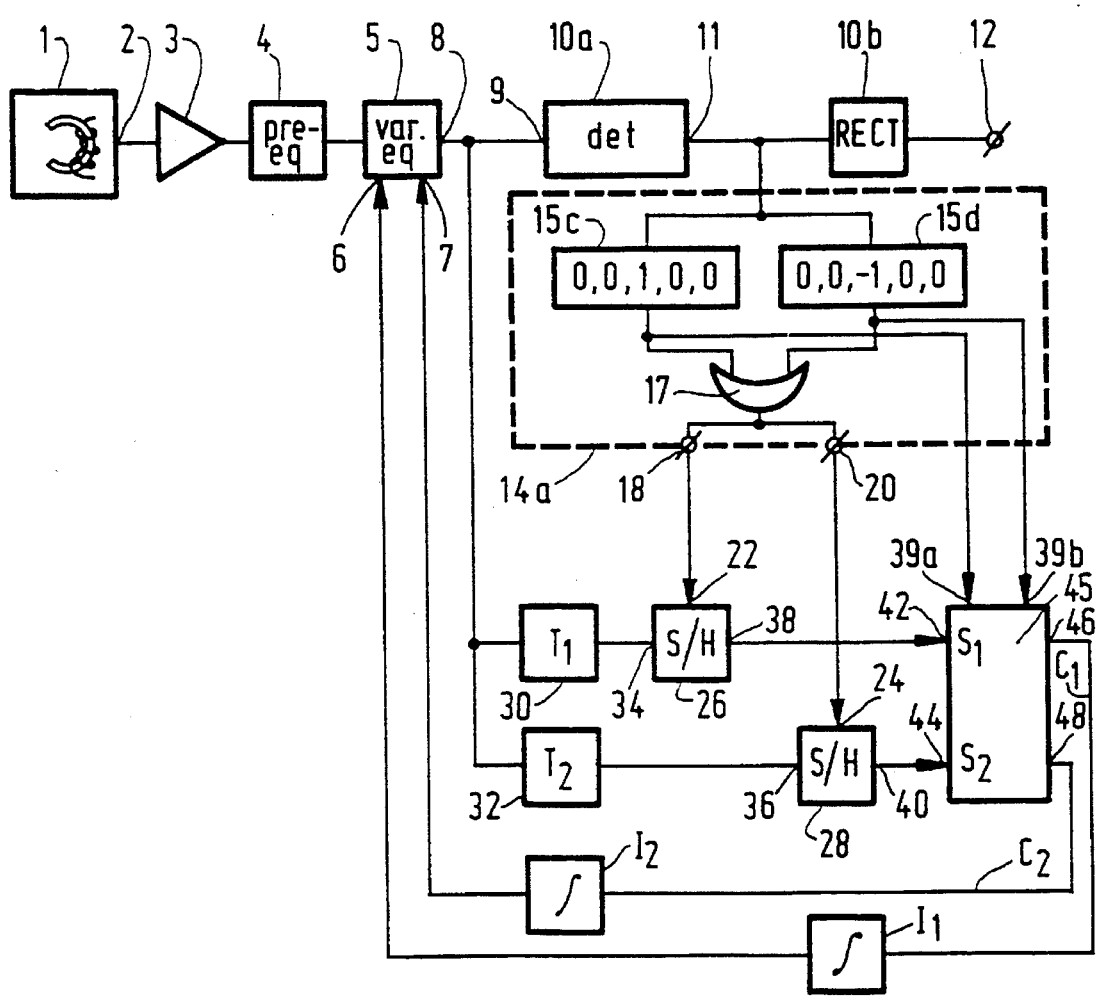
FIG. 5 shows a further elucidated embodiment of a reproducing arrangement for carrying out a Nyquist 1 detection.

FIG. 5 shows an embodiment of the arrangement as per FIG. 1, for producing a digital signal from a track on a record carrier, which shows a further elaboration of the equalizer control section 13. The embodiment comprises a read unit including a read head 1, which can be a stationary head, or a head accommodated on a rotating drum. An output 2 of the read unit is coupled via the preamplifier 3 and the pre-equalizer 4 to an input of the variable equalizer 5. The equalizer 5 is adapted to equalize the signal applied to its input as regards magnitude and phase (or delay) as a function of frequency, in response to control signals applied to control inputs 6 and 7 of the variable equalizer 5. The equalized signal is applied to the output 8. The output signal of the equalizer 5, which is an analog signal, is applied to an input 9 of the detector 10. The detector 10 can be in the form of a Viterbi detector. The detector 10 comprise two sections, a section 10a and a section 10b. A sampling frequency signal is derived in detector section 10a using a phase locked loop (not shown) included in the detector section 10a, which phase locked loop receives for that purpose for example the output signal of the variable equalizer 5. The analog signal supplied to the input 9 of detector section 10a is sampled with the sampling frequency so as to obtain sampled values. The sampled values are compared in a comparator (not shown) with a positive and a negative threshold level. Samples exceeding the positive threshold level are the '1' bits, samples exceeding the negative threshold level are the '−1' bits and sampled values not exceeding both threshold values are the '0' bits. This results in a three valued bit stream of bits occurring at the sampling instants ..., −3τ, −2τ, −τ, 0, τ, 2τ, 3τ, ... The detector section 10b includes a rectifier (not shown) so as to rectify the '−1' bits, leading to '1' bits in the bit stream. The bit stream obtained is applied to the output terminal 12 of the arrangement.

The output of the detector section 10a is coupled to an input of a selector 14a for selecting arrays of bits (0,0,1,0,0) and (0,0,−1,0,0) in the non-rectified output signal of the detector 10a. The detector 14a comprises selector stages 15c and 15d respectively for selecting the (0,0,1,0,0) and (0,0,−1,0,0) bit sequences respectively. Outputs of the stages 15c and 15d are coupled to an OR-gate 17. An output of the OR-gate 17 is coupled to outputs 18 and 20 of the array selector 14a. The bit array selector 14a generates selection signals at the outputs 18 and 20 when either a (0,0, 1,0,0) or a (0,0,−1,0,0) bit sequence has been detected by the selector stages 15c and 15d respectively. When a selection signal occurs, the analog signal that led to the (0,0, 1,0,0) or the (0,0,−1,0,0) bit sequence in the non-rectified bit stream present at the output of detector 10a is sampled exactly at the time instant corresponding to the time instant of occurrence of the (zero) bit directly adjoining the '1' or '−1' bit at its left and its right side in the (0,0,1,0,0) and (0,0,−1,0,0) bit sequence respectively.

The output 8 of the variable equalizer 5 is coupled via a first delay unit 30 to a signal input 34 of the sample-and-hold unit 26, and via a second delay unit 32 to a signal input 36 of the sample-and-hold unit 28. Outputs 38 and 40 of the sample-and-hold units 26 and 28 are coupled to inputs 42 and 44 respectively of an equalizer control signal generator 45. The output 18 of the selector 14a is coupled to a control input of the sample-and-hold unit 26. The output 20 of the selector 14a is coupled to a control input of the sample-and-hold unit 28.

Upon the receipt of a selection signal from the selector 14a applied to the sample-and-hold unit, this unit samples the analog signal applied to its signal input and holds the value of the sample during a certain time interval, so as to supply this value to one of the inputs of the equalizer control signal generator 45.

The delay units 30 and 32 delay the signals applied to its inputs over a time interval of $T_1$ and $T_2$ respectively. The delay interval $T_1$ has been chosen such that, when a selection signal occurs at the output 18 of the selection unit 14a, the analog signal that lead to the (0,0,1,0,0) or the (0,0,−1,0,0) bit sequence in the non-rectified bit stream present at the output 11 of the detection stage 10a is sampled exactly at the time instant corresponding to the time instant of occurrence of the second bit in the (0,0,1,0,0) or the (0,0,−1,0,0) bit sequence.

From what has been explained with reference to FIGS. 2a–2j, it can be concluded that, if the equalizer 5 is set such that the intersymbol interference is zero and if the sampling instants are located in time such that one sampling instant is exactly at the location of the time of occurrence of the maximum value of the response function of FIG. 2b, the sample value of the sample of the analog signal sampled by the sample-and-hold 26 will have a zero amplitude. For an incorrect setting of the equalizer 5, this value will be non-zero.

The delay interval $T_2$ has been chosen such that, when a detection signal occurs at the output 20 of the selection unit 14a, the analog signal that lead to the (0,0,1,0,0) or the (0,0,−1,0,0) bit sequence in the non-rectified bit stream present at the output of the detector stage 10a is sampled exactly at the time instant corresponding to the time instant of occurrence of the fourth bit in the (0,0,1,0,0) or the (0,0,−1,0,0) bit sequence.

Again from what has been explained with reference to FIGS. 2a–2j, it can be concluded that, if the equalizer 5 is set to its correct value, the sample value of the sample of the analog signal obtained in the sample-and-hold circuit 28 will have a zero amplitude. For an incorrect setting of the equalizer 5, this value will be non-zero.

It should however be noted that it might be necessary in some applications to sample the analog signal at time instants lying a little bit further than one bit time T away from the time instant of occurrence of the maximum amplitude in the impulse response.

The sample values $s_1$ and $s_2$ derived in the sample-and-hold circuits 26 and 28 correspond in fact to the samples $a(t=-\tau)$ and $a(t=\tau)$ respectively in the table of FIG. 3. The sample values are applied to the equalizer control signal generator 45. This generator 45 generates a first control signal which has a relation to the sum of the sample values $s_1$ and $s_2$, which first control signal $c_1$ is applied to the output 46. More specifically, it can be said that the first control signal is proportional to the sum of both sample values. The generator 45 further generates a second control signal $c_2$ which has a relation to the difference, such as $s_1-s_2$, between both sample values. More specifically, this second control signal is proportional to the difference between both sample values.

In order to discriminate between positive going signal transitions and negative going transitions, the output of the selector stage 15c is coupled to an input 39a of the generator 45. Further, the output of the selector stage 15d is coupled to an input 39b of the generator 45. Upon detection of a positive going transition, a signal is applied to the input 39a of the generator 45, so that the generator 45 generates first and second control signals which satisfy: $c_1=s_1+s_2$, and $c_2=s_1-s_2$ respectively. Upon detection of a negative going transition, a signal is applied to the input 39b, so that, the generator 45 generates first and second control signals which satisfy: $c_1=-(s_1+s_2)$ and $c_2=-(s_1-s_2)$ respectively.

The first and second control signals thus obtained are applied to control inputs 6 and 7 respectively of the variable equalizer 5, via integrating elements $I_1$ and $I_2$. Under the influence of the output signal of the integrating element $I_1$ which is applied to the input 6, the equalizer is controlled as regards its magnitude response as a function of frequency such that the first control signal becomes substantially zero. That means that, in the case that the first control signal is positive, the high frequency emphasis is increased (that is: the magnitude of the equalizer characteristic in the high(er) frequency range is increased, or, the magnitude of the equalizer characteristic in the low(er) frequency range is decreased), and in the case that the first control signal is negative, the high frequency emphasis is decreased (that is: the magnitude of the equalizer characteristic in the high(er) frequency range is decreased, or, the magnitude of the equalizer characteristic in the low(er) frequency range is increased).

Under the influence of the output signal of the integrating element $I_2$ which is applied to the input 7, the equalizer is controlled as regards its phase response (delay) as a function of frequency, such that the second control signal becomes substantially zero. That means that, in the case that the second control signal is positive (that is: $D_h-D_1$ is positive), the delay in the high(er) frequency range is decreased, or the delay in the low(er) frequency range is increased, and in the case that the second control signal is negative (that is: $D_h-D_1$ is negative), the delay in the high(er) frequency range is increased, or the delay in the low(er) frequency range is decreased.

Figure 6A:
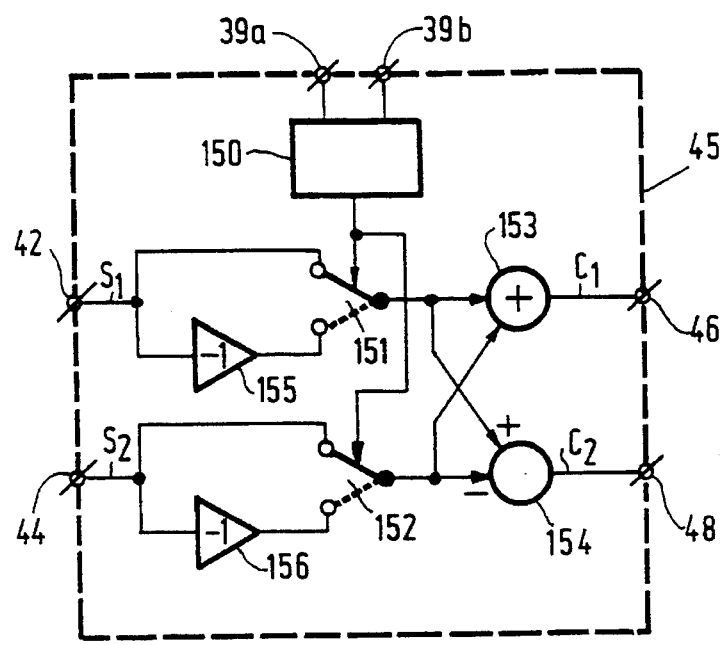
FIG. 6a shows an embodiment of a control signal generator.

FIG. 6a shows an embodiment of the control signal generator 45 of FIG. 5. The generator 45 comprises two inverting elements 155 and 156, two switches 151 and 152, two signal combination units 153 and 154 and a switching signal generator 150. The signal combination unit 153 functions as an adder and the combination unit 154 functions as a subtractor. If a selection signal is applied to the input 39a, the switching signal generator 150 generates a signal such that the switches 151 and 152 are in their upper positions, as shown. Output signals $c_1$ and $c_2$ occur at the outputs 46 and 48 respectively which equal $s_1+s_2$ and $s_1-s_2$ respectively. If a selection signal is applied to the input 39b, the switching signal generator 150 generates a signal at its output such that the switches 151 and 152 are in the lower positions. Now, output signals $c_1$ and $c_2$ occur at the outputs 46 and 48 respectively which equal $-(s_1+s_2)$ and $-(s_1-s_2)$ respectively.

An embodiment of the equalizer 5 capable of carrying out such control under the influence of the output signals of the integrating elements $I_1$ and $I_2$ will be explained hereinafter.

Figure 6B:
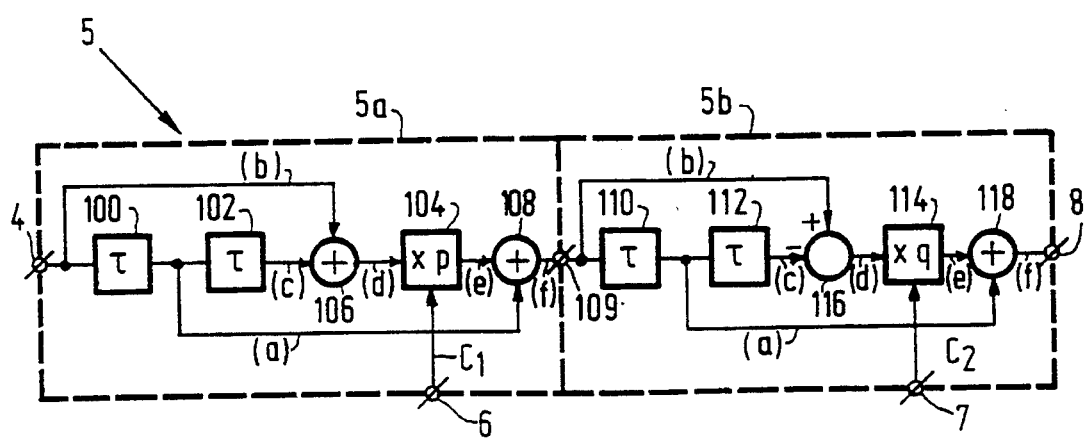
FIG. 6b shows an embodiment of the variable equalizer in the arrangement of FIG. 5.

FIG. 6b shows an embodiment of the variable equalizer 5, having a first equalizer section 5a for realizing an equalization as to magnitude, and a second section 5b for realizing an equalization as to phase. The section 5a receives the output signal of the integrating element $I_1$ via the control signal input 6. The section 5b receives the output signal of the integrating element $I_2$ via the control signal input 7. The section 5a comprises a series arrangement of delay lines 100 and 102, a signal combination unit 106 in the form of a signal adder, a multiplication unit 104 and a signal combination unit 108 in the form of a signal adder. The delay units 100 and 102 delay the signal applied to its inputs by the time interval $\tau$. The input 4 is coupled to a second input of the signal adder 106 and the output of the delay line 100 is coupled to a second input of the adder 108. The multiplication unit 104 multiplies the output signal of the adder 106 by a factor p. The control signal input 6 is coupled to a control input of the multiplication unit 104, so as to control the multiplication factor p in response to the output signal of the integrating element $I_1$.

Figure 7A:
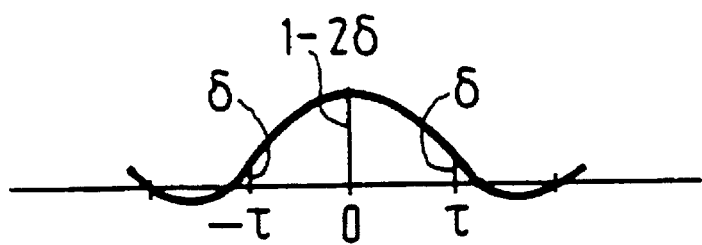
Figure 7B:
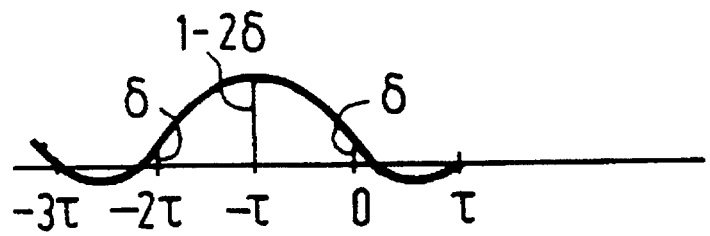
Figure 7C:
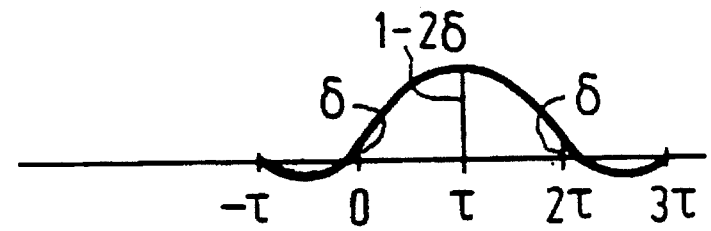
Figure 7D:
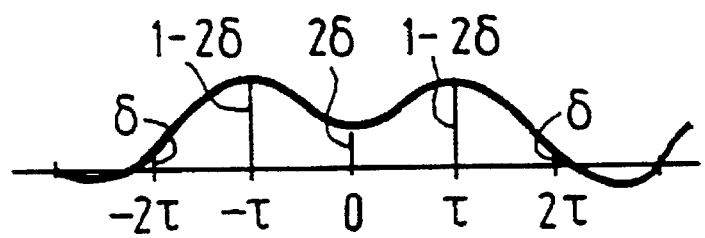
Figure 7E:
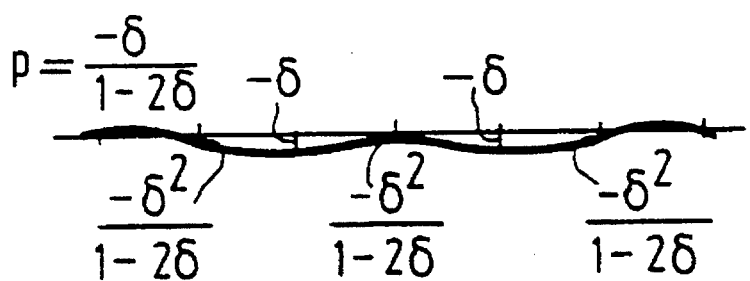
Figure 7F:
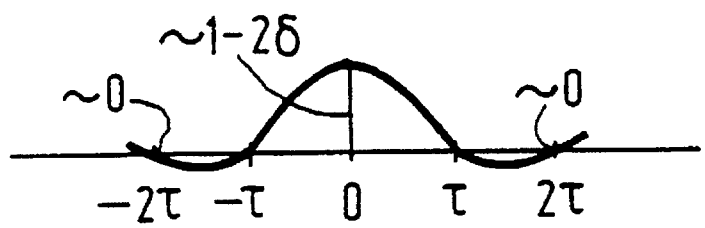

FIGS. 7a–7f shows the functioning of the section 5a on the analog response signal of FIG. 2d. This response signal is also given in FIG. 7a and shows the Nyquist 1 shaped pulse which is too wide. This results in non-zero, that is positive, signal amplitudes at the time instants $t=-\tau$ and $t=\tau$ of $\delta$, and an amplitude of $1-2\delta$ at time instant $t=0$. The signal in FIG. 7a is the output signal of the first delay line 100, which is applied to the second input of the adder 108. The signal of FIG. 7b is the response signal of FIG. 7a as it was received a time interval $\tau$ earlier at the input 4. This signal is applied to the second input of the adder 106. The signal of FIG. 7c is the signal of FIG. 7a, delayed by a time interval $\tau$, present at the output of the delay line 102, which signal is applied to the first input of the adder 106. FIG. 7d shows the output signal of the adder 106. The signal of FIG. 7d has signal values of $1-2\delta$ and $\delta$ at the time instants $(t=)$ $-2\tau$, $-\tau$, 0, $\tau$ and $2\tau$ respectively. In response to the output signal of the integrating element $I_1$, the multiplier 104 multiplies the signal of FIG. 7d with a factor of $-\delta(1-2\delta)$, which results in signal values of $-\delta^2/(1-2\delta), -\delta, -2\delta^2/(1-2\delta), -\delta$ and $-\delta^2/(1-2\delta)$ at the time instants $(t=)$ $-2\tau$, $-\tau$, 0, $\tau$ and $2\tau$ respectively. The signal values including the factor $\delta^2$ will be disregarded again, as $\delta$ is considered small in relation to the value 1. FIG. 7f shows the output signal of the adder 108. As can be seen in FIG. 7f, the signal values at the time instants $(t=)$ $-2\tau$, $-\tau$, 0, $\tau$ and $2\tau$ are ~0, 0, ~$(1-2\delta)$, 0 and ~0 respectively. The result is a symmetric response with signal values of zero for the time instants $t=-\tau$ and $t=\tau$.

FIGS. 8a–8f show how the section 5a processes a response signal such as the one given in FIG. 8a, which corresponds with the situation as described with reference to FIG. 2f. The pulse width is too small so that negative amplitudes exist at the time instants $t=-\tau$ and $t=\tau$. FIGS. 8b and 8c show the signals present at the two inputs of the adder 106. FIG. 8d shows the corresponding output signal of the adder 106. Under the influence of the output signal of the integrating element $I_1$, the multiplier now realizes a multiplication by a factor of $\delta/(1+2\delta)$, so the signal of FIG. 8e appears at its output. This signal has amplitudes of $-\delta^2/(1+2\delta)$, $\delta$, $-2\delta^2/(1+2\delta)$, $\delta$ and $-\delta^2/(1+2\delta)$ at the time instants $(t=)$ $-2\tau$, $-2\tau$, 0, $\tau$ and $2\tau$ respectively. The signal values including the factor $\delta^2$ will be disregarded again, as $\delta$ is considered small in relation to the value 1. FIG. 8f shows the output signal of the adder 108. As can be seen in FIG. 8f, the signal values at the time instants $(t=)$ $-2\tau$, $-\delta$, 0, $\delta$ and $2\tau$ are ~0, 0, ~$(1+2\delta)$, 0 and ~0 respectively. The result is a symmetric response with signal values of zero for the time instants $t=-\tau$ and $t=\tau$.

The second section 5b in FIG. 6b which realizes the equalization as to phase, receives the output signal of the integrating element $I_2$ via the control signal input 7. The section 5b comprises a series arrangement of delay lines 110 and 112, a signal combination unit 116 in the form of a signal subtractor, a multiplication unit 114 and a signal combination unit 118 in the form of a signal adder. The delay units 110 and 112 delay the signal applied to its inputs by the time interval $\tau$. The output of section 5a, which is the input 109 of the section 5b, is coupled to a second input of the signal subtractor 116 and the output of the delay line 110 is coupled to a second input of the adder 118. The multiplication unit 114 multiplies the output signal of the subtractor 116 by a factor q. The control signal input 7 is coupled to a control input of the multiplication unit 114, so as to control the multiplication factor q in response to the output signal of the integrating element $I_2$.

Figure 9A:
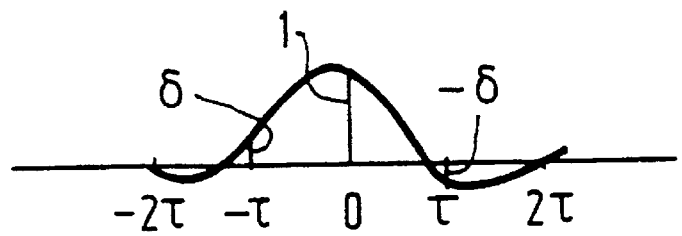
Figure 9B:
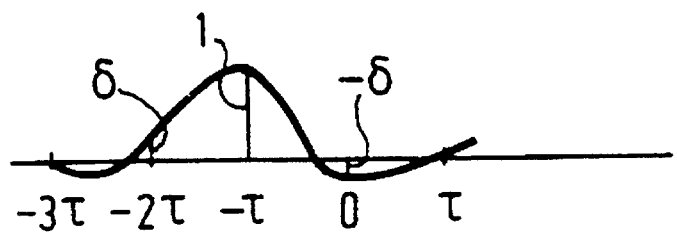
Figure 9C:
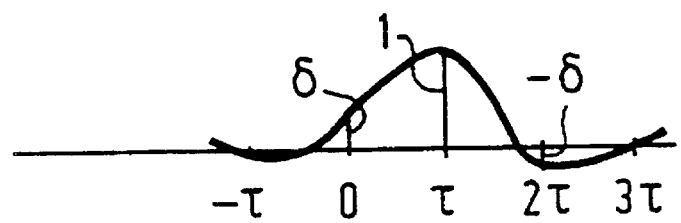
Figure 9D:
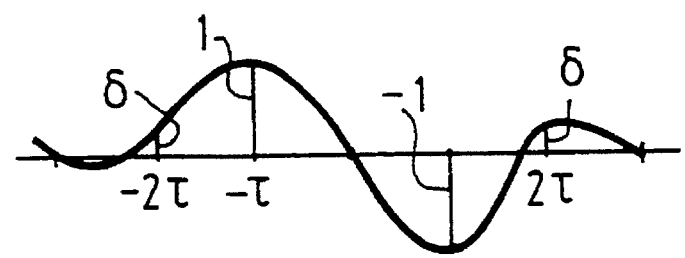
Figure 9E:
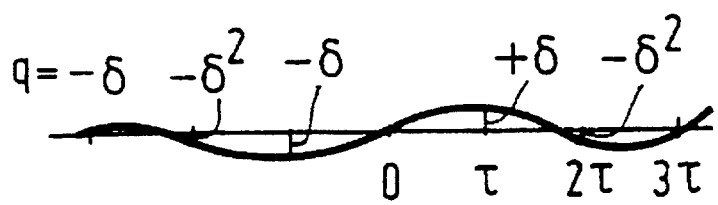
Figure 9F:
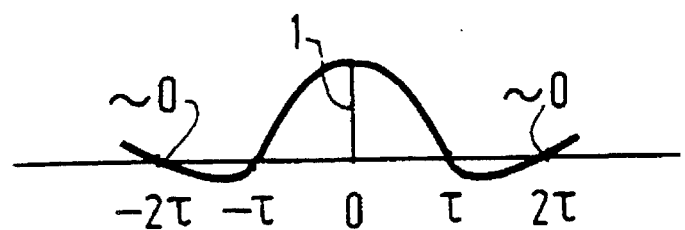

FIGS. 9b–9f show the functioning of the section 5b on an analog response signal such as the one given in FIG. 9a. This response signal corresponds to the situation described with reference to FIG. 2g, and shows the Nyquist 1 shaped pulse which is asymmetric. This results in non-zero signal amplitudes at the time instants $t=-\tau$ and $t=\tau$ of $\delta$ and $-\delta$ respectively, and an amplitude of 1 at time instant $t=0$. The signal in FIG. 9a is the output signal of the first delay line 110, which is applied to the second input of the adder 118. The signal of FIG. 9b is the response signal of FIG. 9a as it was received a time interval $\tau$ earlier at the input 109. This signal is applied to the second input of the subtractor 116. The signal of FIG. 9c is the signal of FIG. 9a, delayed by a time interval $\tau$, present at the output of the delay line 112, which signal is applied to the first input of the subtractor 116. FIG. 9d shows the output signal of the subtractor 116. The signal of FIG. 9d has signal values of $\delta$, 1, 0, $-1$ and $\delta$ at the time instants $(t=)$ $-2\tau$, $\tau$, 0, $\tau$ and $2\tau$ respectively. In response to the output signal of the integrating element $I_2$, the multiplier 114 multiplies the signal of FIG. 9d with a factor of $-\delta$, which results in signal values of $-\delta^2$, $-\delta$, 0, $+\delta$ and $-\delta^2$ at the time instants $(t=)$ $-2\tau$, $-\delta$, 0, $\tau$ and $2\tau$ respectively. The signal values including the factor $\delta^2$ will be disregarded again, as $\delta$ is considered small in relation to the value 1. FIG. 9f shows the output signal of the adder 118. As can be seen in FIG. 9f, the signal values at the time instants $(t=)$ $-2\tau$, $-\tau$, 0, $\tau$ and $2\tau$ are ~0, 0, 1, 0 and ~0 respectively. The result is a symmetric response with signal values of zero for the time instants $t=-\tau$ and $t=\tau$.

Figure 10A:
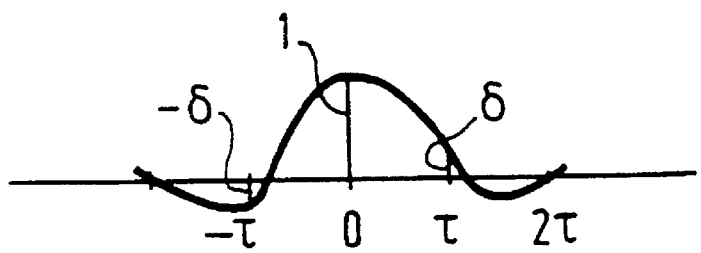
Figure 10B:
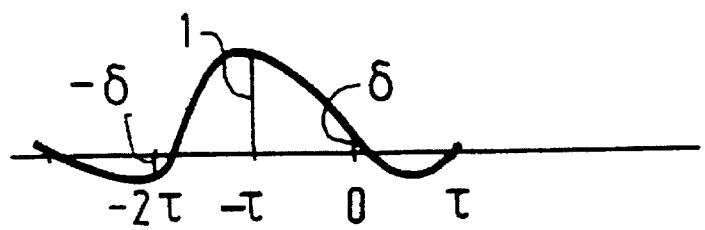
Figure 10C:
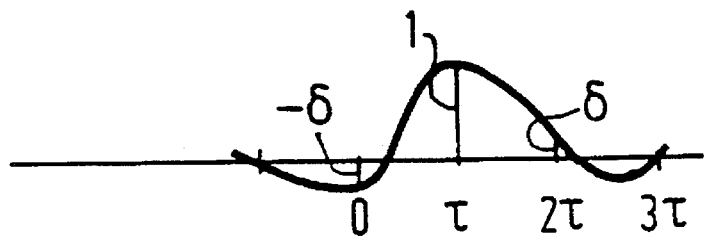
Figure 10D:
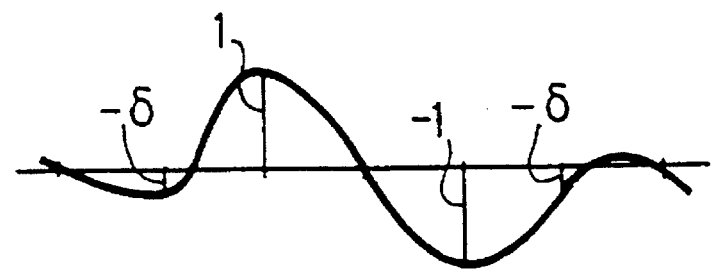
Figure 10E:
Figure 10F:
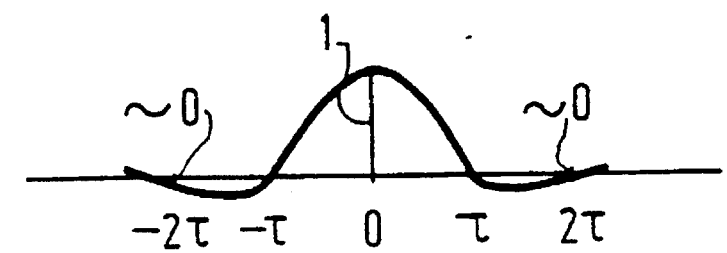

FIGS. 10a–10f show how the section 5b processes a response signal such as the one given in FIG. 10a, which corresponds with the situation as described with reference to FIG. 2i. The response is asymmetric so that non-zero amplitudes of $-\delta$ and $\delta$ exist at the time instants $t=-\tau$ and $t=\tau$ respectively. From an extensive description of this signal processing is unnecessary, as this signal processing is analogous to the signal processing describe in FIGS. 9a–9f. The difference is that in this case the output signal of the integrating element $I_2$ realizes an amplification factor q which is equal to $\delta$ in the multiplier 114. As a result a symmetric response with signal values of zero for the time instants $t=-\tau$ and $t=\tau$ is obtained at the output 8.

The equalizer adaptation method described above is in the form of a feedback system, and has a control loop so as to control the equalizer response. The method has a number of advantages.

1. Variations in the amplitude of the signal applied to the detector section 10a do not influence the zero crossings in this signal. Therefore, the control signals applied to the variable equalizer 5 remain constant.

2. No training sequences are needed, because useful data patterns are selected from regular data detected.

3. Detection and selection of the required data patterns is already possible when starting with a significant misalignment of the variable equalizer 5. This because of the fact that selected flux transitions are not influenced by neighbouring transitions. Thus proper selection tolerates a large deviation from the response that is strived for, namely a response without intersymbol interference.

4. The integrating behaviour of the control loop realizes a summation of the results obtained when detecting subsequent arrays of (0,0,1,0,0) and (0,0,−1,0,0), which leads to a suppression of the influence of a DC component or low frequency components, if present, in the signal applied to the detector section 10a.

It should be noted here that the invention has been explained for situations where either the response to a transition in the write current is affected by a too low (or a too) high HF pre-emphasis, or where the response is affected by a non constant delay as a function of frequency. It is submitted here that both phenomena, that is the occurrence of an incorrect HF pre-emphasis and the occurrence of a non-constant delay as a function of frequency, can simultaneously affect an impulse response. The sample values $a(t=-\tau)$ and $a(t=\tau)$ are now built up of two contributions, one originating from the incorrect pre-emphasis and one originating from the incorrect delay.

Figure 11A:
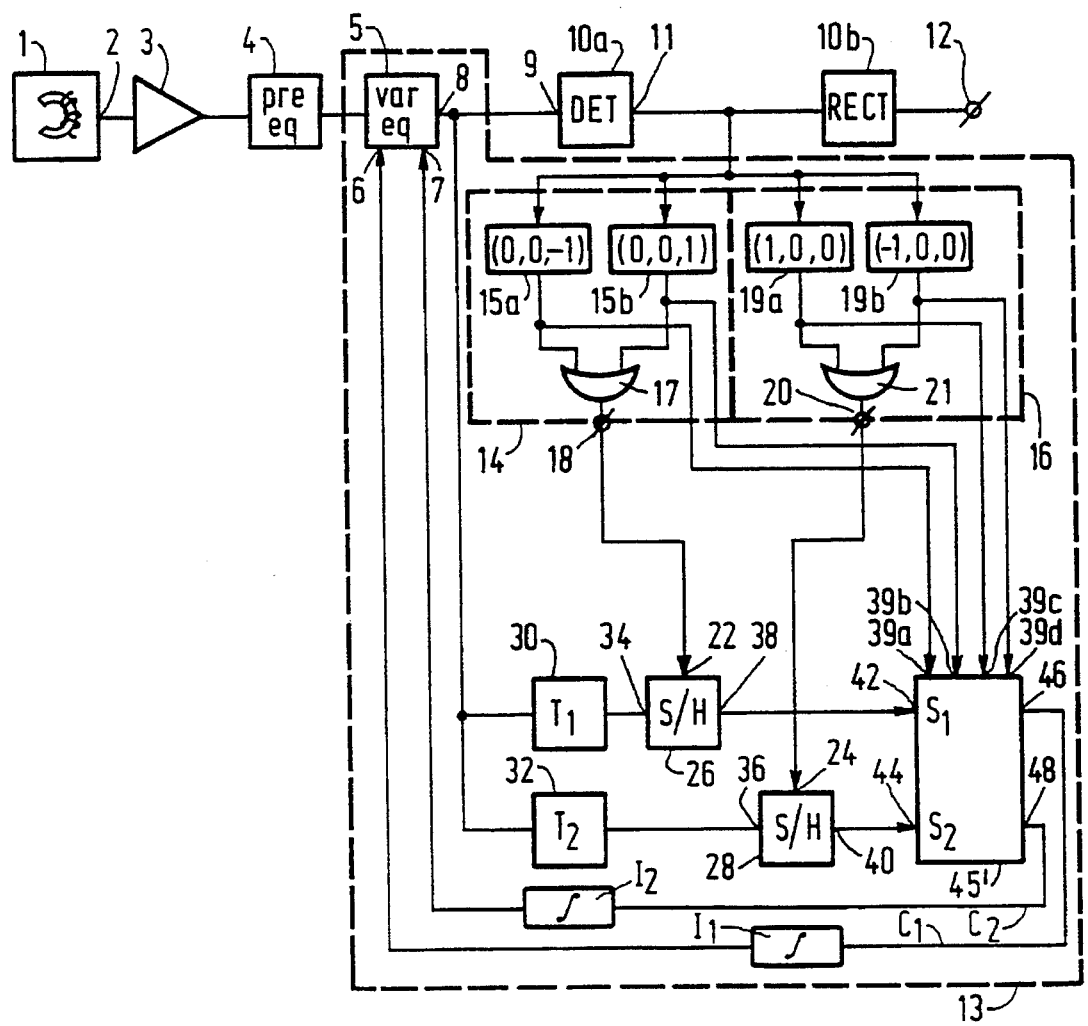
FIG. 11a shows an other embodiment of a reproduction arrangement for carrying out a Nyquist 1 detection.

FIG. 11a discloses a slightly different version of the arrangement of FIG. 5, in that the arrangement comprises a bit array selector 14 for selecting arrays of bits (0,0,−1), (0,0,1), (1,0,0) and (−1,0,0). This selection criterion has the advantage of a higher probability of occurrence of the various bit arrays.

The output 11 of the detection section 10a is coupled to inputs of a first bit array selector 14 and a second bit array selector 16. The bit array selector 14 supplies a first selection signal at an output 18 if an array of bits (0, 0,−1) or an array of bits (0,0,1) is selected in the non-rectified bit stream present at the output 11. For that purpose, the selector 14 comprises selector stages 15a and 15b for selecting the arrays (0,0,−1) and (0,0,1) respectively. Outputs of the stages 15a and 15b are coupled to the output 18 via an OR-gate 17. The bit army selector 16 supplies a second selection signal at an output 20 if an array of bits (1, 0, 0) or an array of bits (−1,0,0) is selected in the non-rectified bit stream present at the output 11. For that purpose, the selector 16 comprises selector stages 19a and 19b for selecting the arrays (1,0,0) and (−1,0,0) respectively. Outputs of the stages 19a and 19b are coupled to the output 20 via an OR-gate 21. The first and second selection signals are applied to control inputs 22 and 24 respectively of the sample-and-hold units 26 and 28 respectively.

Upon the receipt of a selection signal applied to a sample-and-hold unit, this unit samples the analog signal applied to its signal input and holds the value of the sample during a certain time interval, so as to supply this value to one of the inputs of the equalizer control signal generator 45.

The delay units 30 and 32 delay the signals applied to its inputs over a time interval of $T_1$ and $T_2$ respectively. The delay interval $T_1$ has been chosen such that, when a selection signal occurs at the output 18 of the selection unit 14, the analog signal that lead to the (0,0,1) or the (0,0,−1) bit sequence in the non-rectified bit stream present at the output 11 of the detector stage 10a is sampled exactly at the time instant corresponding to the time instant of occurrence of the central (zero) bit in the (0,0,1) or the (0,0,−1) bit sequence.

From what has been explained with reference to FIG. 2a–2j, it can be concluded that, if the equalizer 5 is set such that the intersymbol interference is zero and if the sampling instants are located in time such that one sampling instant is exactly at the location of the time of occurrence of the maximum value of the response function of FIG. 2b, the sample of the analog signal will have a zero amplitude. For an incorrect setting of the equalizer 5, this value will be non-zero.

The delay interval $T_2$ has been chosen such that, when a selection signal occurs at the output 20 of the selection unit 16, the analog signal that lead to the (1,0,0) or the (−1,0,0) bit sequence in the non-rectified bit stream present at the output of the detector stage 10a is sampled exactly at the time instant corresponding to the time instant of occurrence of the central (zero) bit in the (1,0,0) or the (−1,0,0) bit sequence.

Again from what has been explained with reference to FIGS. 2a–2j, it can be concluded that, if the equalizer 5 is set to its correct value, the sample of the analog signal obtained in the sample-and-hold circuit 28 will have a zero amplitude. For an incorrect setting of the equalizer 5, this value will be non-zero.

Assuming that the selection methods in the selectors 15a, 15b, 19a and 19b are equal, it can be concluded that the delays $T_1$ and $T_2$ in the delay circuits 26 and 32 equal each other. This means that the delay circuits can be replaced by one delay circuit having a delay $T_1$, coupled in the common part of the electrical connection from the output of the equalizer means 5 to the two sample-and-hold circuits 26 and 28.

The sample values $s_1$ and $s_2$ derived in the sample-and-hold circuits 26 and 28 correspond in fact to the samples $a(t=-\tau)$ and $a(t=\tau)$ respectively in the table of FIG. 3. The sample values are applied to the equalizer control signal generator 45. This generator 45 generates the first and the second control signal in the following way.

In order to discriminate between positive going signal transitions and negative going transitions, the outputs of the selector stages 15b and 15b are coupled to inputs 39a and 39b respectively of the generator 45'. In the same way, the outputs of the selector stages 19a and 19b are coupled to inputs 39c and 39d of the generator 45'. Suppose that two subsequent sequences (0,0,1) and (1,0,0) are detected by the selector stages 15b and 19a. The detection of the (0,0,1) sequence results in a signal being applied to the input 39b of the generator 45'. The detection of the (1,0,0) sequence results in a signal being applied to the input 39c of the generator 45'. In response to those signals, the generator generates first and second control signals $c_1$ and $c_2$ which for instance equal $(s_1+s_2)$ and $(s_1-s_2)$ respectively.

Suppose now that two subsequent sequences (0,0,−1) and (−1,0,0) are selected by the selector stages 15a and 19b. Now signals are applied to the inputs 39a and 39d respectively of the generator 45'. In response to those signals, the generator generates first and second control signals $c_1$ and $c_2$ which in this case equal $-(s_1+s_2)$ and $-(s_1-s_2)$ respectively.

It should however be noted that a (0,0,1) bit array need not necessarily be followed by a (1,0,0) bit array. It is possible that it is followed by any one of the arrays (0,0,1), (1,0,0), (0,0,−1) or (−1,0,0). This results in the generator 45' being of a different construction than the generator 45 of FIG. 6a.

Figure 11B:
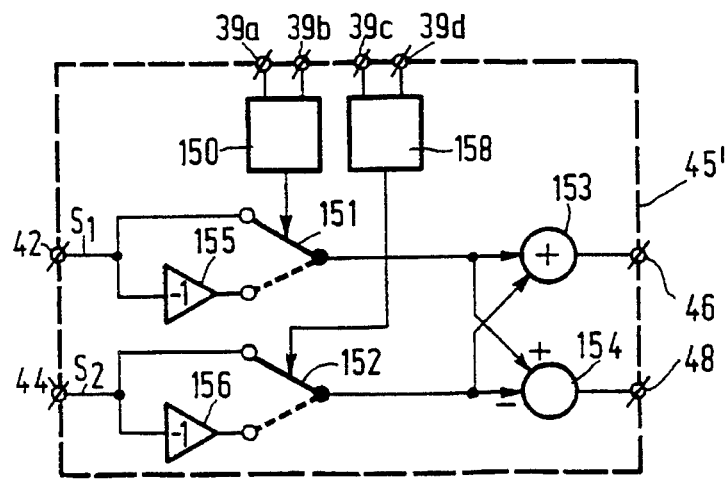
FIG. 11b shows an embodiment of the control signal generator in the arrangement of FIG. 11a, FIG. 12a–12g show a partial response class-4 (PR4) detection of an isolated positive going step transition of the write current on the tape.

FIG. 11b shows that the control signal generator 45' comprises a switching signal generator 150 having inputs coupled to the inputs 39a and 39b of the generator 45', and a switching signal generator 158 having inputs coupled to the inputs 39c and 39d of the generator 45'. Outputs of the switching signal generators 150 and 158 now control the position of the switches 15 1 and 152 respectively. An occurrence of a signal on the input 39*a* controls the switch 151 to the 'down' position, as shown. An occurrence of a signal at the input 39*b* controls the switch to its 'up' position.

An occurrence of a signal on the input 39*c* controls the switch 152 to the 'up' position, as shown. An occurrence of a signal at the input 39*d* controls the switch to its 'down' position.

The embodiment of FIG. 11*a* and 11*b* has the advantage that single bit arrays of three bits, such as the bit arrays (0,0,1) and (1,0,0), can be selected without the necessity that they should occur together in a bit array (0,0,1,0,0). The probability of occurrence of such bit arrays is larger than the occurrence of the bit array (0,0,1,0,0). Further, after each 3-bit bit array selected by one of the selectors 15*a*, 15*b*, 19*a* and 19*b*, the control signals $c_1$ and $c_2$ can be recalculated, and thus the control signals applied to the inputs 6 and 7 of the variable equalizer can be readjusted.

Figure 12A:

FIG. 12*a*–12*g* explains the invention for the situation that a partial response class 4 (PR4) detection is realized during read-out of a positive going transition in the write current. FIG. 12*a* shows the positive going transition in the write current as a function of time. The write current transition of FIG. 12*a* which is recorded on the record carrier is read out by a differentiating head, shaped according to the Nyquist 1 criterion described above with reference to FIG. 1, and applied to a cosine filter. The shaping in accordance with the Nyquist 1 criterion is the same as the shaping described above with reference to FIGS. 1 and 2*a*–2*j*. The combination of the Nyquist 1 shaping and the filtering by means of a cosine filter realizes a PR4 response at the input of the detector section 10*a*. The pre-equalizer 4 of FIG. 1 can be thought of now to include the cosine filter, so as to enable a PR4 detection.

Figure 12B:
Figure 12C:
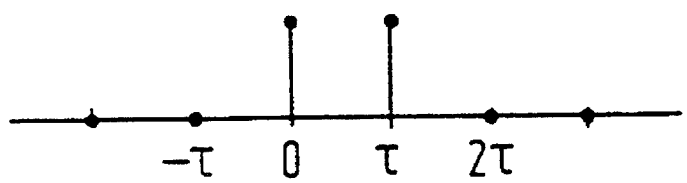

The PR4 detection results, in an ideal situation, in an analog response signal at the output of the pre-equalizer 4 which is given in FIG. 12*b*. The signal given in FIG. 12*c* is a sampled version of the analog response signal, which is obtained by taking the signal values of the analog response signal at the sampling instants . . . , $-\tau$, 0, $\tau$, $2\tau$, . . . In the ideal case, the sampled signal obtained comprises two pulses of equal amplitude at the time instants t=0 and t=$\tau$. The samples on the other time instants have a zero amplitude. With the assumption that the amplitudes at the time instants t=0 and t=$\tau$ equal unity, the sampled signal of FIG. 12*c* can thus be expressed as ( . . . , 0, 0, 1, 1, 0, 0, . . . ).

Figure 12D:
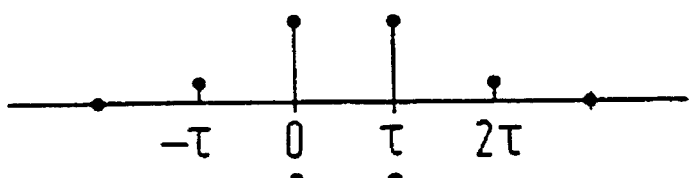

An inadequate equalization during read-out, changes the pulse width of the signal of FIG. 12*b*, which results in samples in the vicinity of the two pulses deviating from zero. FIG. 12*d* shows this effect, when the low(er) frequencies in the output signal of the pre-equalizer 4 are over-emphasized compared to the high(er) frequencies in said output signal. The result is a positive amount of intersymbol interference at the time instants t=$-\tau$ and t=$2\tau$. The sampled signal can now be expressed as ( . . . , ~0, $\delta$, 1–$\delta$, 1– $\delta$, $\delta$, ~0, . . . ).

Figure 12E:
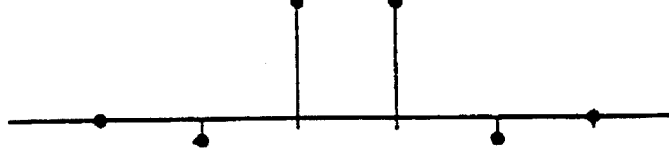

FIG. 12*e* shows a situation when the high(er) frequencies in the output signal of the pre-equalizer 4 are over-emphasized compared to the low(er) frequencies. In that case, a negative amount of intersymbol interference is present as samples that occur at the time instants t=$-\tau$ and t=$2\tau$, and which have a negative amplitude. The sampled signal can now be expressed as ( . . . , ~0, –$\delta$, 1+$\delta$, 1+$\delta$, –$\delta$, 0, . . . ).

Figure 12F:
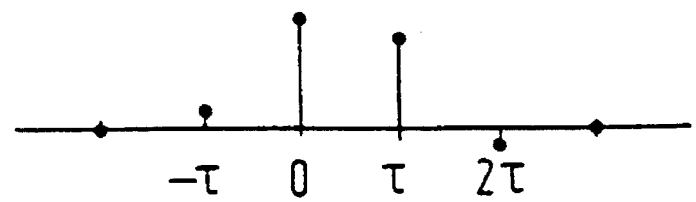

FIG. 12*f* shows the effect on the signal read out if the transmission in the transmission path up till the output of the pre-equalizer 4 exhibits a delay for high(er) frequencies is higher than for low(er) frequencies. The result is an asymmetric response. As will be clear from this figure, a sample of positive amplitude appears at the time instant t=$-\tau$, and a sample of negative amplitude appears at the time instant t=$2\tau$. The sampled signal can now be expressed as ( . . . , ~0, $\delta$, 1+$\delta$, 1–$\delta$, –$\delta$, ~0, . . . ). It will be obvious that a sample of negative amplitude will appear at the time instant t=$-\tau$ and a sample of positive amplitude will appear at the time instant t=$2\tau$ in the case that the delay for high(er) frequencies is lower than for low(er) frequencies. The sampled signal can then be expressed as ( . . . , ~0, –$\delta$, 1–$\delta$, 1+$\delta$, $\delta$, ~0, . . . ), see FIG. 12*g*.

From the foregoing it has become clear that, in a situation where an isolated step transition in the write current occurs, the amplitudes of the samples occurring at the time instants t=$-\tau$ and t=$2\tau$ during read-out, give an indication as to the equalization carried out. The table given in FIG. 3 can be used here as well, to show all the possible situations that can occur for the samples a(t=$-\tau$) and a(t=$2\tau$) that directly adjoin the two pulses at t=0 and t=$\tau$. For a(t=$\tau$) in the table should be read a(t=$2\tau$). The conclusions that can be derived from those situations are the same for the PR4 detection as described with reference to FIG. 12*a*–12*g*.

In the same way as stated above with reference to FIG. 4*a*–4*d* for the Nyquist 1 detection method, also in the case of a PR4 detection method it should be noted that the conclusions given above only apply for situations where subsequent transitions in the write current occur not too close to each other, viewed in time. This can be explained with reference to FIGS. 13*a*–13*d*.

Figure 13A:
FIGS. 13a–13d show the influence of an erroneous equalizer setting on the signal read out in response to two step transitions that are spaced 3τ away from each other.
Figure 13B:
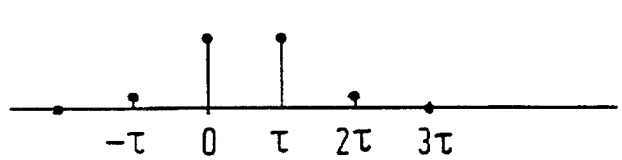
Figure 13C:
Figure 13D:
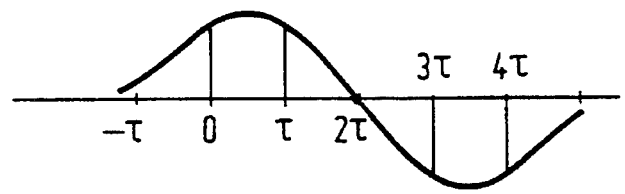

FIG. 13*a* shows a situation where a positive going transition and a negative going transition in the write current are spaced a time interval of 3$\tau$ away. FIG. 13*b* shows the signal read out in response to the positive going transition and FIG. 13*c* shows the signal read out in response to the negative going transition. As can be seen from those figures, the HF equalization is too low. The total response to both transitions is given as the sampled signal in FIG. 13*d*. The signal in FIG. 13*d* is the sum of the signals of FIG. 13*b* and 13*c*. As can be seen from FIG. 13*d*, the signal amplitude at t=$2\tau$ is zero, as the positive signal amplitude at t=$2\tau$ in FIG. 13*b* cancels the negative amplitude at t=$2\tau$ in FIG. 13*c*. Detection of the signal amplitude at t=$2\tau$ could lead to the conclusion that no intersymbol interference is present, which is in fact not the case, as is shown in FIG. 13*b* and 13*c*. The situation of FIG. 13*a*, where the digital write current is in the form of ( . . . , –1, 1, 1, 1, –1, . . . ) is therefore less suitable for the determination of an incorrect equalization.

From the FIGS. 12*d*–12*g* it has become clear that the assumption is made that an incorrect equalization during read-out of a positive or negative going transition has a major influence on the signal values at the time instants t=$-\tau$ to t=$2\tau$, and that this influence can be neglected for time instants lying further away from the time instant t=0. This has been made clear in the FIGS. 12*d*–12*g* by equalling the amplitude of the sampled signal for the time instants –2$\tau$ and 3$\tau$ to zero. That means that the interaction between two subsequent transitions, as described with reference to FIG. 13, is considered negligible as soon as two subsequent transitions lie a time spacing of at least 4$\tau$ apart. As this should also be the case for a directly preceding transition, it can therefore be concluded that a positive going transition can be used for determining the amount of equalization if the write current has the following form ( . . . , –1, –1, –1, –1, 1, 1, 1, 1, . . . ), or, if the sampled signal equals ( . . . , 0, 0, 1, 1, 0, 0, . . . ) in the ideal situation. In the same way, a negative going transition in the write current can be used if the digital write signal equals ( . . . , 1, 1, 1, 1, –1, –1, –1, –1, . . . ), which realizes a sampled signal in the form of the array of samples ( . . . , 0, 0, −1, −1, 0, 0, . . . ) in the ideal situation. The two zero-valued samples at time instants −τ and 2τ, that directly adjoin the samples at the time instants t=0 and t=τ (see FIG. 12c), are used for determining the correct equalization. This means that arrays of bits (0, 0, 1, 1, 0, 0) and (0, 0, −1, −1, 0, 0) in the output signal of the detector section 10a should be detected.

The probability of occurrence of such arrays of bits is rather low, namely $2^{-8}$ for each array, assuming that the bit patterns are random. That means that the probability that either the one or the other bit array occurs, is equal to $2^{-7}$. In order to increase the number of situations that can be used for determining the correct equalization, one could detect the situations where the output signal of the detector section 10a includes the following arrays of four bits: (0, 0, 1, 1), (0, 0, −1, −1), (−1, −1, 0, 0) and (1, 1, 0, 0) separately. The probability of occurrence of those arrays of samples is higher, $2^{-6}$ for each array. The probability that one of the four bit arrays occurs is thus $2^{-4}$. The second sample from the left in the array of four samples of the sampled signal that corresponds to the (0, 0, 1, 1) bit array or the (0, 0, −1, −1) bit array in the digital output signal, and the third sample from the left in the array of four samples of the sampled signal that corresponds to the (−1, −1, 0, 0) bit array or the (1, 1, 0, 0) bit array in the digital output signal, should now be used for determining whether the equalization is correct or not. The value of the second sample in the array of samples corresponding to the (0, 0, −1, −1) bit array or the (0, 0, 1, 1) bit array can be used as the sample a(t=−τ) in the table of FIG. 3, and the value of the third sample in the array of samples corresponding to the (−1, −1, 0, 0) bit array or the (1, 1, 0, 0) bit array can be used as the sample a(t=τ) in the table of FIG. 3.

Thus a selector is present to select the following arrays of bits: (0,0,0,1), (0, 0, −1, −1), (1, 1, 0, 0) or (−1, −1, 0, 0). If a more accurate selection is needed one could select the following arrays of (five consecutive) samples: (−1, 0, 0, 1, 1), (1, 0, 0, −1, −1), (1, 1, 0, 0, −1) or (−1, −1, 0, 0, 1). This selection criterion is especially useful in the situation where the detection means 10a includes a Viterbi detector. If either the array (−1, 0, 0, 1, 1) or the array (1, 0, 0, −1, −1) has been selected, the sample in the sampled signal that corresponds to the central bit in the two arrays can be used as the a(t=−τ) value in the table of FIG. 3. Further, the sample in the sampled signal that corresponds to the second bit in the two arrays can be used as the a(t=τ) value in the table of FIG. 3. The reason for this is that, if an array (−1, 0, 0, 1, 1) is detected, the bit directly preceding the '−1' bit in this array, is also a '−1' bit. In the same way, if an array (1, 0, 0, −1, −1) is detected, the bit directly preceding the '1' bit in this array, is also a '1' bit.

The same reasoning is valid for the arrays (1, 1, 0, 0, −1) and (−1, −1, 0, 0, 1). The sample value in the sampled signal corresponding with the central bit in both arrays can be used as the a(t=τ) value in the table of FIG. 3. The sample value in the sampled signal corresponding with the fourth bit in both arrays can be used as the a(t=−τ) value in the table of FIG. 3.

Figure 14:
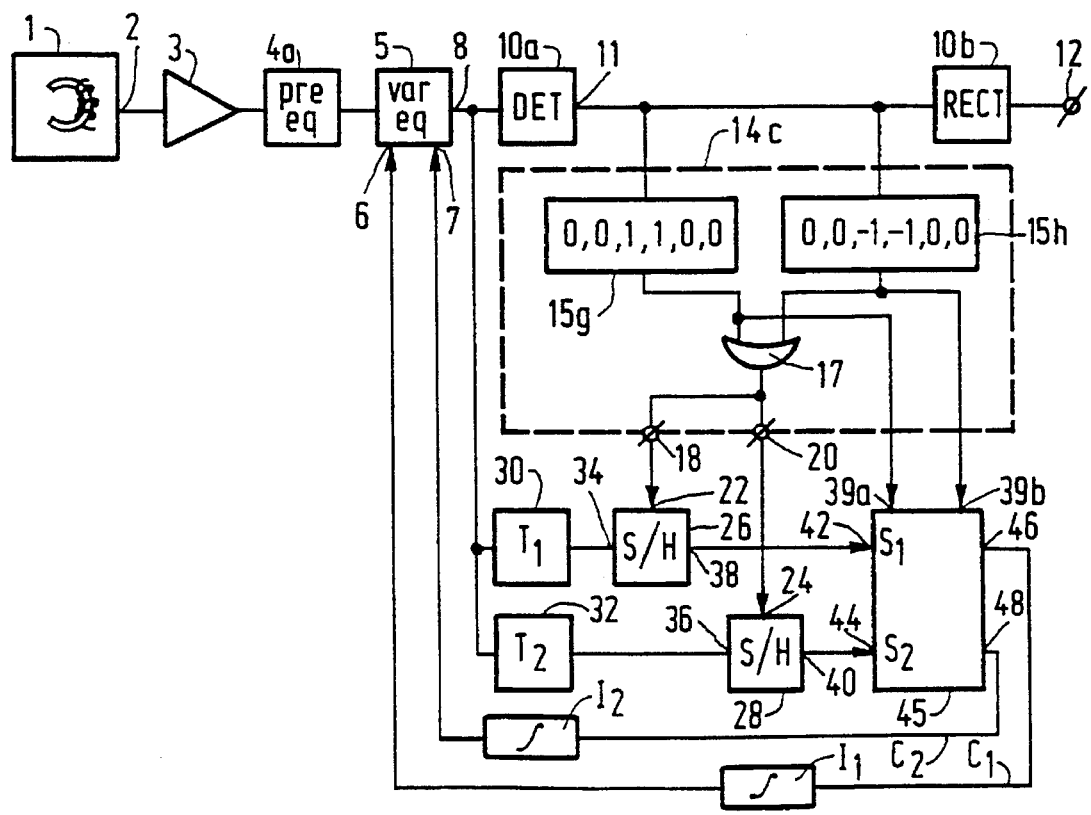
FIG. 14 shows an embodiment of a reproducing arrangement for carrying out a PR4 detection.

FIG. 14 discloses an embodiment in which a PR4 detection is carried out on the signal read out. The arrangement largely resembles the arrangement of FIG. 5, with the exception that the pre-equalizer 4a has a different transmission characteristic. The cosine filter characteristic is now included in pre-equalizer 4a, and a the selection unit 14c now selects a (0,0,1,1,0,0) or a (0,0,−1,−1,0,0) bit sequence in the non-rectified output signal of the detector stage 10a. For that purpose, the selection unit 14c comprises selection stages 15g and 15h for selecting a (0,0,1,1,0,0) and a (0,0,−1,1,0,0) bit sequence respectively, and an OR gate 17.

When a selection signal occurs at the output 18 of the selection unit 14c, the analog signal at the output of the variable equalizer 5 that lead to the (0,0,1,1,0,0) or the (0,0,−1,−1,0,0) bit sequence in the non-rectified bit stream present at the output of the detector 10a, is sampled exactly at the time instant corresponding to the time instant of occurrence of the second (zero) bit in the (0,0,1,1,0,0) or the (0,0,−1,−1,0,0) bit sequence. When the selection signal occurs at the output 20 of the selection unit 14c, the analog signal at the output of the equalizer 5 that lead to the (0,0,1,1,0,0) or the (0,0,−1,−1,0,0) bit sequence in the non-rectified bit stream present at the output 11 of the detector 10a is sampled exactly at the time instant corresponding to the time instant of occurrence of the fifth bit (which is the third zero bit) in the (0,0,1,1,0,0) or (0,0,−1,−1,0,0) bit sequence. The generation of the control signals $c_1$ and $c_2$ is the same as in the embodiment of FIG. 5, in the sense that again the outputs of the stages 15g and 15h are coupled to inputs 39a to 39d respectively of the generator 45, so as to obtain the first and second control signals with the correct sign, dependent of the occurrence of a positive or a negative going transition in the write current that is detected.

The variable equalizer 5 can have the same construction as the variable equalizer 5 of FIG. 11a, that is the construction as shown in FIG. 6b.

FIGS. 15a–15g show the correction of a response signal that is too wide such as the one given in FIG. 15a. Non-zero sample values having an amplitude δ occur at the time instants t=−τ and t=2τ and amplitudes of 1−δ occur at time instants t=0 and t=τ. The signal in FIG. 15a is the output signal of the first delay line 100 in the section 5a, which is applied to the second input of the adder 108. The signal of FIG. 15b is the response signal of FIG. 15a as it was received a time interval τ earlier at the input 4. This signal is applied to the second input of the adder 106. The signal of FIG. 15c is the signal of FIG. 15a, delayed by a time interval τ, present at the output of the delay line 102, which signal is applied to the first input of the adder 106. FIG. 15d shows the output signal of the adder 106. The signal of FIG. 15d has signal values of δ, 1−δ, 1, 1, 1−δ and δ at the time instants (t=) −2τ, −τ, 0, τ, 2τ and 3τ respectively. In response to the output signal of the integrating element $I_1$, the multiplier 104 multiplies the signal of FIG. 15d with a factor of −δ/(1−δ), which results in signal values of substantially zero at the time instants t=−2τ and t=3τ, of −δ at the time instants t=−τ and t=2τ, and of −(1−δ) at the time instants t=0 and t=τ. δ is again considered small in relation to the value 1. FIG. 15f shows the output signal of the adder 108. As can be seen in FIG. 15f, the signal values at the time instants (t=) −2τ, −τ, 0, τ, 2τ and 3τ are ~0, 0, ~(1−2δ), δ(1−2δ), 0 and ~0 respectively. The result is a symmetric response with signal values of zero for the time instants t=−τ and t=2τ.

When correcting, by means of the section 5a, a too narrow response, which means that the signal values at the time instants t=−τ and t=2τ are negative and equal −δ, see FIG. 12e, the output signal of the integrating element $I_1$ controls the multiplier such that the signal applied to its input is multiplied by a factor δ/(1+δ). The result is again a symmetric response with signal values of zero amplitude at the time instants t(=) −2τ, −τ, 2τ and 3τ, and amplitudes ~1 at t=0 and t=τ.

Figure 16A:
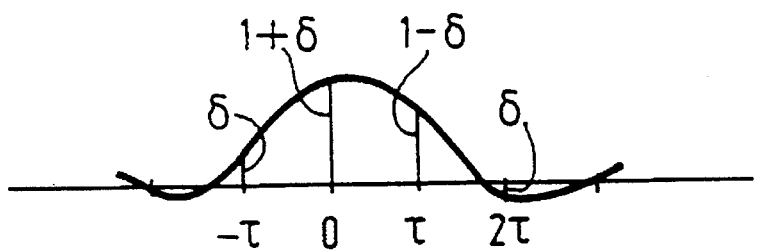
Figure 16B:
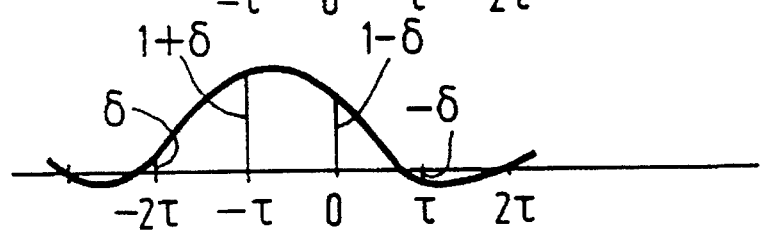
Figure 16C:
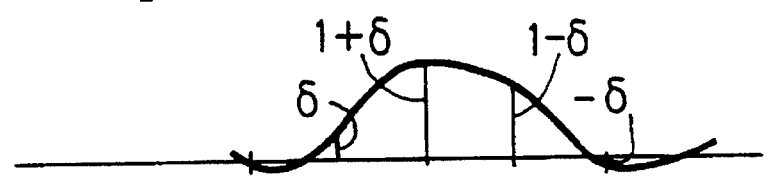
Figure 16D:
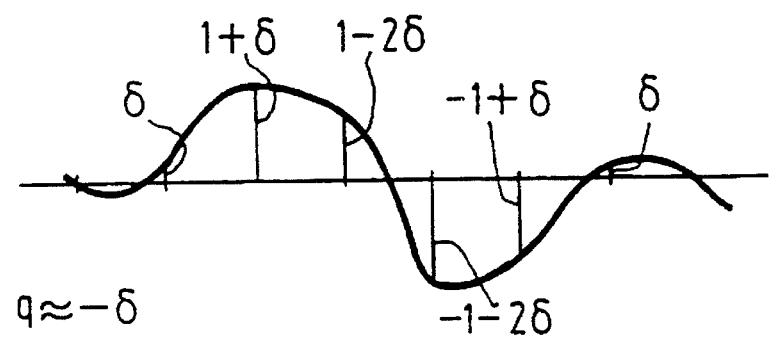
Figure 16E:
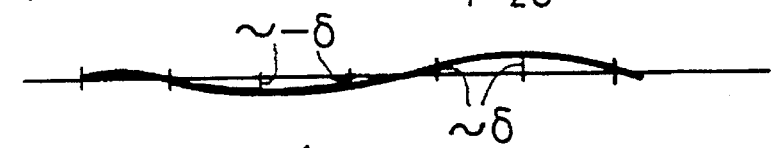
Figure 16F:
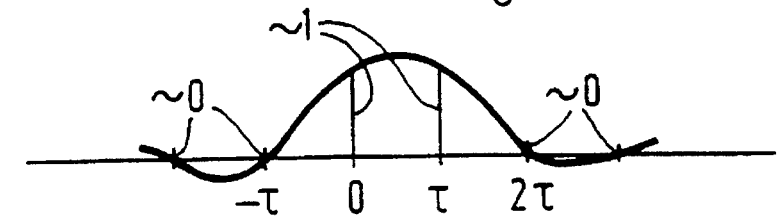

FIGS. 16a–16f show the functioning of the section 5b in FIG. 6b on an analog response signal such as the one in FIG. 16a. This response signal corresponds to the situation described with reference to FIG. 12f, and shows the pulse which is asymmetric. This results in non-zero signal amplitudes at the time instants t=–τ and t=2τ of δ and –δ respectively, and amplitudes of 1+δ at t=0 and 1–δ at t=τ. The signal in FIG. 16a is the output signal of the first delay line 110 in section 5b, which is applied to the second input of the adder 118. The signal of FIG. 16b is the response signal of FIG. 16a as it was received a time interval τ earlier at the input 109. This signal is applied to the second input of the subtractor 116. The signal of FIG. 16c is the signal of FIG. 16a, delayed by a time interval τ, present at the output of the delay line 112, which signal is applied to the first input of the subtractor 116. FIG. 16d shows the output signal of the subtractor 116. The signal of FIG. 16d has signal values of δ, 1+δ, 1–2δ, –1–2δ, –1+δ and δ at the time instants (t=) –2τ, –τ, 0, τ, 2τ and 3τ respectively. In response to the output signal of the integrating element $1_2$, the multiplier 114 multiplies the signal of FIG. 16d with a factor of approximately –δ, which results in signal values of ~0, ~–δ, ~–δ, ~+δ and ~0 at the time instants (t=) –2τ, –τ, 0, τ, 2τ and 3τ respectively. δ is again considered small in relation to the value 1. FIG. 16f shows the output signal of the adder 118. As can be seen in FIG. 16f, the signal values at the time instants (t=) –2τ, –τ, 0, τ, 2τ and 3τ are ~0, ~0, ~1, ~1, ~0 and ~0 respectively. The result is a symmetric response with signal values approximately zero for the time instants t=–τ and t=2τ.

Figure 12G:
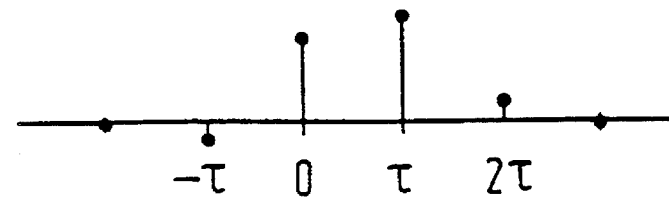

When correcting, by means of the section 5b, a response as per FIG. 12g, which means that the signal values at the time instants t=–τ and t=2τ are equal to –δ and δ respectively, the output signal of the integrating element $I_2$ controls the multiplier such that the signal applied to its input is multiplied by a factor δ. The result is again a symmetric response with signal values of approximately zero amplitude at the time instants t(=) –2τ, –τ, 2τ and 3τ, and amplitudes ~1 at t=0 and t=τ.

Figure 17:
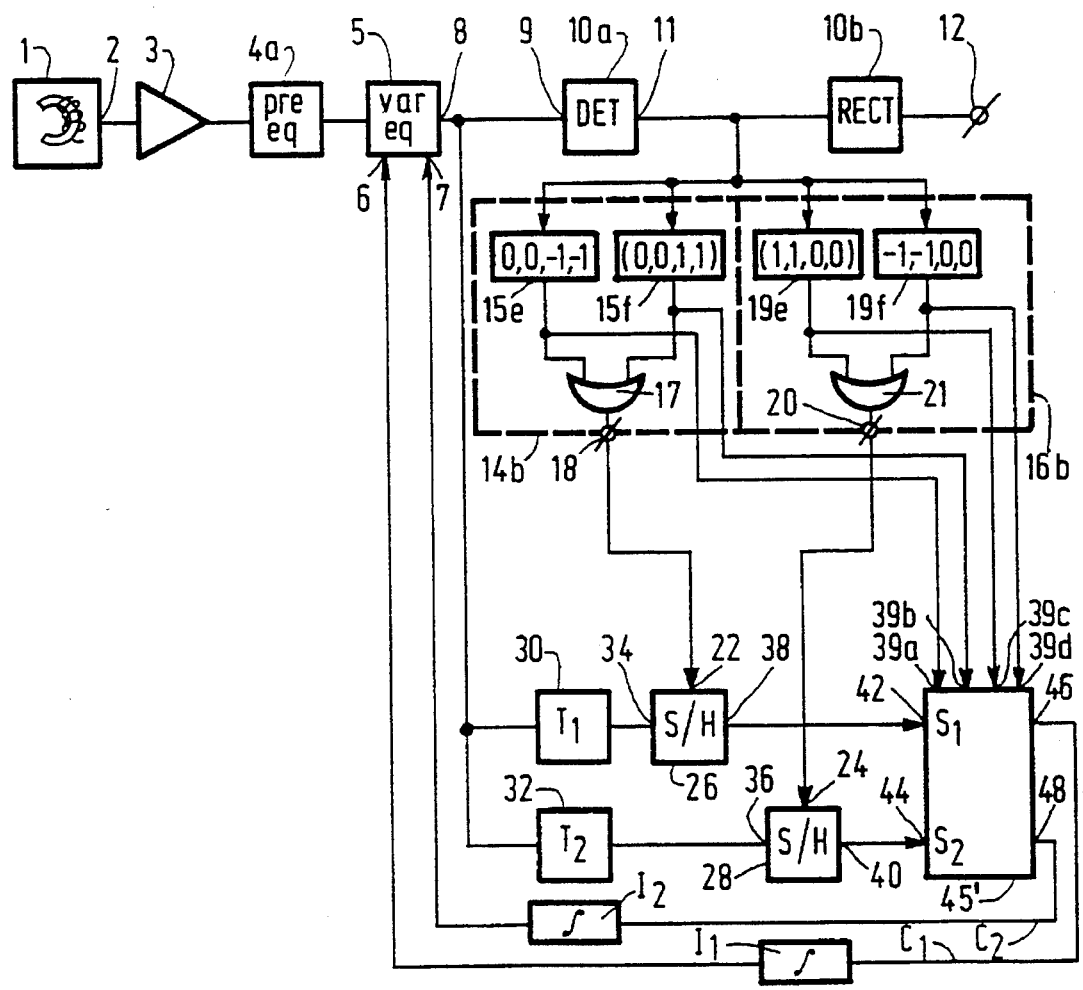
FIG. 17 shows a second embodiment for carrying out a PR4 detection.

FIG. 17 discloses another embodiment in which a PR4 detection is carried out on the signal read out. The arrangement largely resembles the arrangement of FIG. 11a, with the exception that the pre-equalizer 4a has a different transmission characteristic. The cosine filter characteristic is now included in pre-equalizer 4a, a selection unit 14b now selects a (0,0,1,1) or a (0,0,–1,–1) bit sequence and a selection unit 16b now selects a (1,1,0,0) or a (–1,–1,0,0) bit sequence in the non-rectified output signal of the detector stage 10a. For that purpose, the selection unit 14b comprises selection stages 15e and 15f for selecting a (0,0,–1,–1) and a (0,0,1,1) bit sequence respectively, and an OR gate 17. The selection unit 16b comprises selection stages 19e and 19f for selecting a (1,1,0,0) and a (–1,–1,0,0) bit sequence respectively and an OR gate 21.

When a selection signal occurs at the output 18 of the selection unit 14b, the analog signal at the output of the variable equalizer 5 that lead to the (0,0, 1,1) or the (0,0,–1,–1) bit sequence in the non-rectified bit stream present at the output of the detector 10a is sampled exactly at the time instant corresponding to tho time instant of occurrence of the second (zero) bit in the (0,0,1,1) or the (0,0,–1,–1) bit sequence. When a selection signal occurs at the output 20 of the selection unit 16b, the analog signal at the output of the equalizer 5 that lead to the (1,1,0,0) or the (–1,–1,0,0) bit sequence in the non-rectified bit stream present at the output 11 of the detector 10a is sampled exactly at the time instant corresponding to the time instant of occurrence of the third bit (which is the first zero bit) in the (1,1,0,0) or (–1,–1,0,0) bit sequence. The generation of the control signals $c_1$ and $c_2$ is the same as in the embodiment of FIG. 11a, in the sense that again the outputs of the stages 15e, 15f, 19e and 19f are coupled to inputs 39a to 39d respectively of the generator 45', so as to obtain the first and second control signals with the correct sign, dependent of the occurrence of a positive or a negative going transition in the write current that is detected.

As has been said previously, the embodiment of FIG. 14 is less useful, in that the probability of occurrence of the selected bit arrays is much lower than in the embodiment of FIG. 17.

The invention is equally well applicable in a full response detection system. FIGS. 18a–18j show how a positive going step transition in the write current is detected. FIG. 18a shows the positive going step transition. Detection takes place by means of sampling the analog read-out signal. This leads in the ideal situation to the sampled signal given in FIG. 18b. Negative-samples occur at the time instants prior to t=0, and positive samples occur at time instants t=0, τ, 2τ, ... FIG. 18b also shows the digital signal, which is the bit sequence ..., 0, 0, 1, 1, 1, ... at the sampling instants t=. .., –2τ, –τ, 0, τ, 2τ, ..., obtained after detection in a bit detector.

Carrying out a (1–D) operation on the read-out signal, means delaying the read-out signal by t=τ and subtracting the delayed signal from the non-delayed signal. The (1–D) operation results in a signal that would have been obtained if the signal recorded in the record carrier would have been read out by means of a Nyquist 1 detection method. This will be explained with reference to FIGS. 18b, 18c and 18d. FIG. 18c shows to that purpose the signal of FIG. 18b delayed by t=τ, and FIG. 18d shows the result of subtracting the signal of FIG. 18c from the signal of FIG. 18b. The signal of FIG. 18d equals the signal of FIG. 2c, which is the response obtained when having a Nyquist 1 detection system.

An inadequate equalization during read-out changes the step transition. If the low frequencies are over-emphasized, the transition will be more gradual. This is schematically shown in FIG. 18e, which shows the analog signal as it is read out, and the values of the that signal at the sampling moments. The signal values at t=–τ and t=0 now equal δ and 1–δ respectively. FIG. 18f shows the signal of FIG. 18e delayed by τ, and FIG. 18g shows the result of subtracting both signals. The signal obtained in FIG. 18g equals the signal of FIG. 2e. Non-zero sample values of δ appear at the time instants τ and –τ, and the signal value at t=0 equals 2–2δ.

FIG. 18h shows the situation where the high frequencies are over-emphasized. The transition is now more pronounced, in that signal values of –δ and 1+δ appear at the time instants t=–τ and t=0 respectively. FIG. 18i shows the signal of FIG. 18h delayed by τ, and FIG. 18j shows the result of subtracting both signals. The signal obtained in FIG. 18j equals the signal of FIG. 2f. Non-zero sample values of –δ appear at the time instants τ and –τ and the signal value at t=0 equals 2+2δ.

Similar behavior occurs in the case of the occurrence of a negative going transition in the write current. The difference lies in the fact that in both cases described above, that is: low frequencies over-emphasized and high frequencies over-emphasized, signals as in FIGS. 18g and 18j occur having an inverse polarity.

Figure 19A:
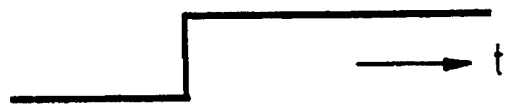
Figure 19B:
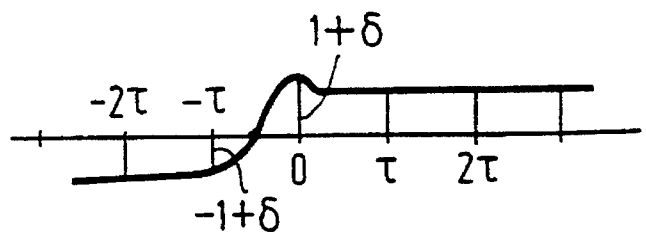
Figure 19C:
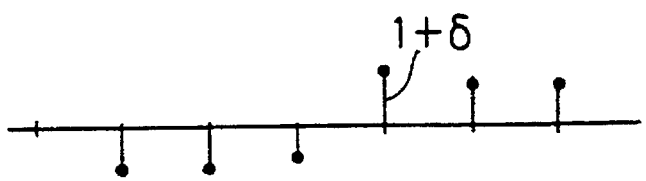
Figure 19D:
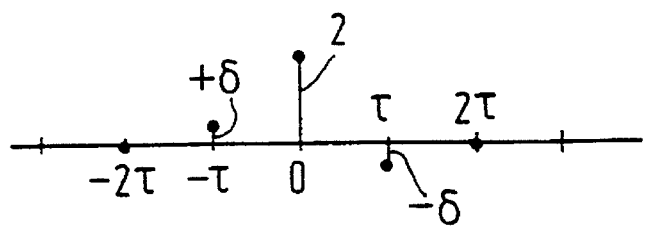

FIG. 19a–19g shows the situation where the high(er) frequencies in the operating frequency range of the transmission channel have not the same delay as the low(er) frequencies. More specifically, FIG. 19b shows the situation where the high(er) frequencies are delayed relatively more than the low(er) frequencies. This results in a more gradual start of the transition. The samples at the sample instants t=−τ and t=0 now equal −1+δ and 1+δ respectively. Delaying this signal, see FIG. 19c, and subtracting both signals results in the signal of FIG. 19d. This signal equals the signal of FIG. 2h. Zero sample values occur for time instants smaller than t=−τ and larger than t=τ. Sample values of +δ and −δ are present for t=−τ and t=τ respectively and a sample value of 2 is present for t=0.

Figure 19E:
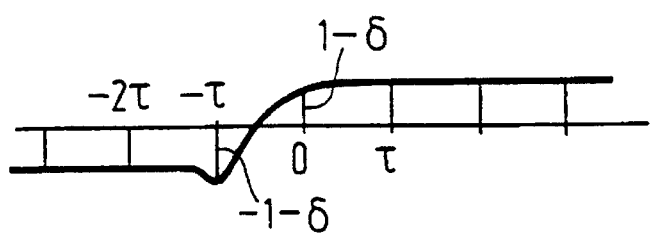
Figure 19F:
Figure 19G:
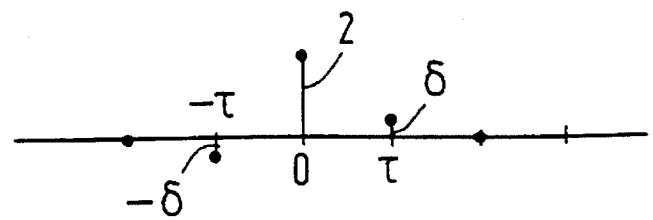

FIG. 19e shows the situation where the low(er) frequencies are delayed relatively more than the high(er) frequencies. This results in a more gradual end of the transition. The samples at the sample instants t=−τ and t=0 now equal −1−δ and 1−δ respectively. Delaying this signal, see FIG. 19f, and subtracting both signals results in the signal of FIG. 19g. This signal equals the signal of FIG. 2j. Zero sample values occur for time instants smaller than t=−τ and larger than t=τ. Sample values of −δ and +δ are present for t=−τ and t=τ respectively and a sample value of 2 is present for t=0.

Similar behavior also exists in the case of the occurrence of a negative going transition in the write current. The difference lies in the fact that in both cases described above, that is: low frequencies being delayed relatively more or less than the high frequencies, signals as in FIGS. 19d and 19g occur having an inverse polarity.

The conclusion should be that, when applying the (1-D) operation on the signal read out, the signal obtained in the (1-D) operation can be used in the way as described above with reference to the Nyquist-1 detection method for determining the equalization carried out, and for controlling the equalization.

As before, subsequent transitions in the write current should again not occur too close to each other. FIG. 20a shows two transitions that are spaced 2τ away from each other. This signal results in the digital output signal . . . , 0, 0, 1, 1, 0, 0, . . . at the output terminal 12. FIG. 20b shows the signal present at the input of the detector 10, in response to the signal of FIG. 20a that is recorded on and read out from tape. It should be noted here that the equalization is not correct, in that the low frequencies are over-emphasized. This results in values for the analog signal applied to the detector of δ, 1−δ, 1−δ and δ for the time instants t=−2τ, −τ, 0 and τ respectively. FIG. 20c shows the signal of FIG. 20b delayed by the time interval τ, and FIG. 20d the signal of FIG. 20b after having carded out the (1-D) operation on the signal of FIG. 20b. From FIG. 20d it is clear that a sample value of zero exists for t=0. This sample value can thus not used for determining whether a correct equalization is carried out, or not.

The conclusion should be that two subsequent step transitions should be spaced at least 3τ away from each other.

Thus, in order to use the sample value at t=−τ in FIGS. 18a–18j and 19a–19g as the value a(t=−τ) in the table of FIG. 3, bit arrays of (0,0,0,1) or (1,1,1,0) should be detected. In order to use the sample value at t=τ in FIGS. 18a–18j and 19a–19g as the values a(t=τ) in the table of FIG. 3, bit arrays of (0,1,1,1) or (1,0,0,0) should be detected.

Figure 21:
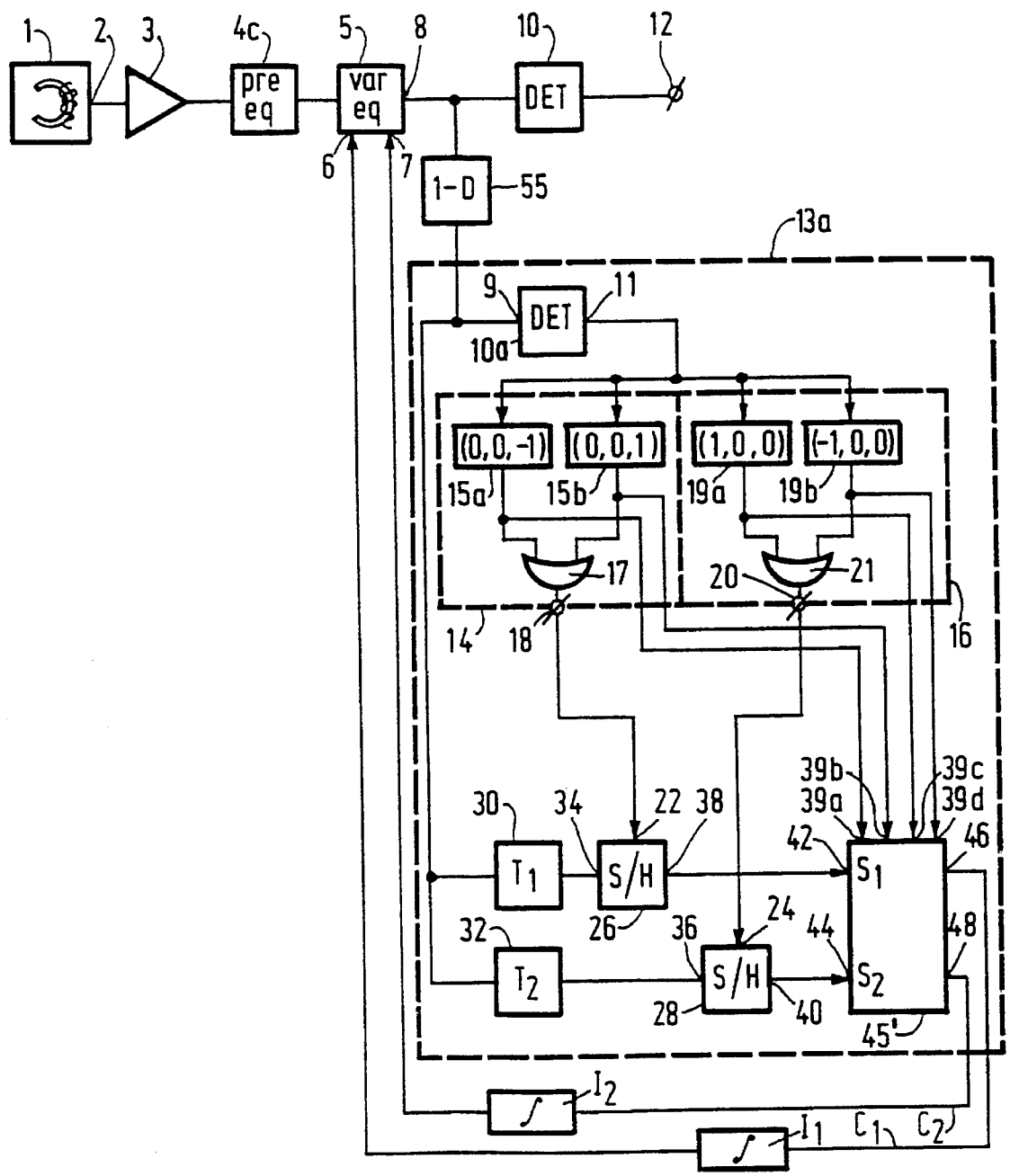
FIG. 21 shows an embodiment of a reproducing arrangement for carrying out a full response detection.

FIG. 21 shows an embodiment in which a full response detection is carried out on the signal read from the track. The full response reproduction channel is formed by the elements 1, 3, 4c, 5 and 10.

Reading out of the step transition given in FIG. 18a results in the bit stream (. . . ,0,0,1,1,1, . . . ) at the output terminal 12, as given in FIG. 18b. As has been said previously, carrying out a (1-D) operation on the (analog) signal read out, which is the signal available at the output of the variable equalizer 5, leads to a signal that would have been obtained if a Nyquist-1 detection would have been carded out on the signal recorded on tape. Therefore, the arrangement includes a (1-D) operator 55 coupled to the output 8 of the variable equalizer 5. As the signal present at the output of the operator 55 is the signal obtained when carrying out a Nyquist 1 detection, the circuit 13a needed to generate the two control signals $c_1$ and $c_2$ can be coupled to the output of the operator 55. This circuit 13a can be a copy of a part of the circuit 13 of FIG. 11a that realizes that function. For that purpose, the output of operator 55 is coupled to the input of the detector 10a and to the inputs of the delay units 30 and 32. The functioning of the elements in the circuit 13a has been described extensively with reference to FIG. 11a.

It is evident that instead of the selector units 14 and 16 and the generator 45' in FIG. 21, the selector unit 14a and the generator 45 of FIG. 5 could have been used to detect the required bit sequences and to obtain the control signals $c_1$ and $c_2$.

Figure 22:
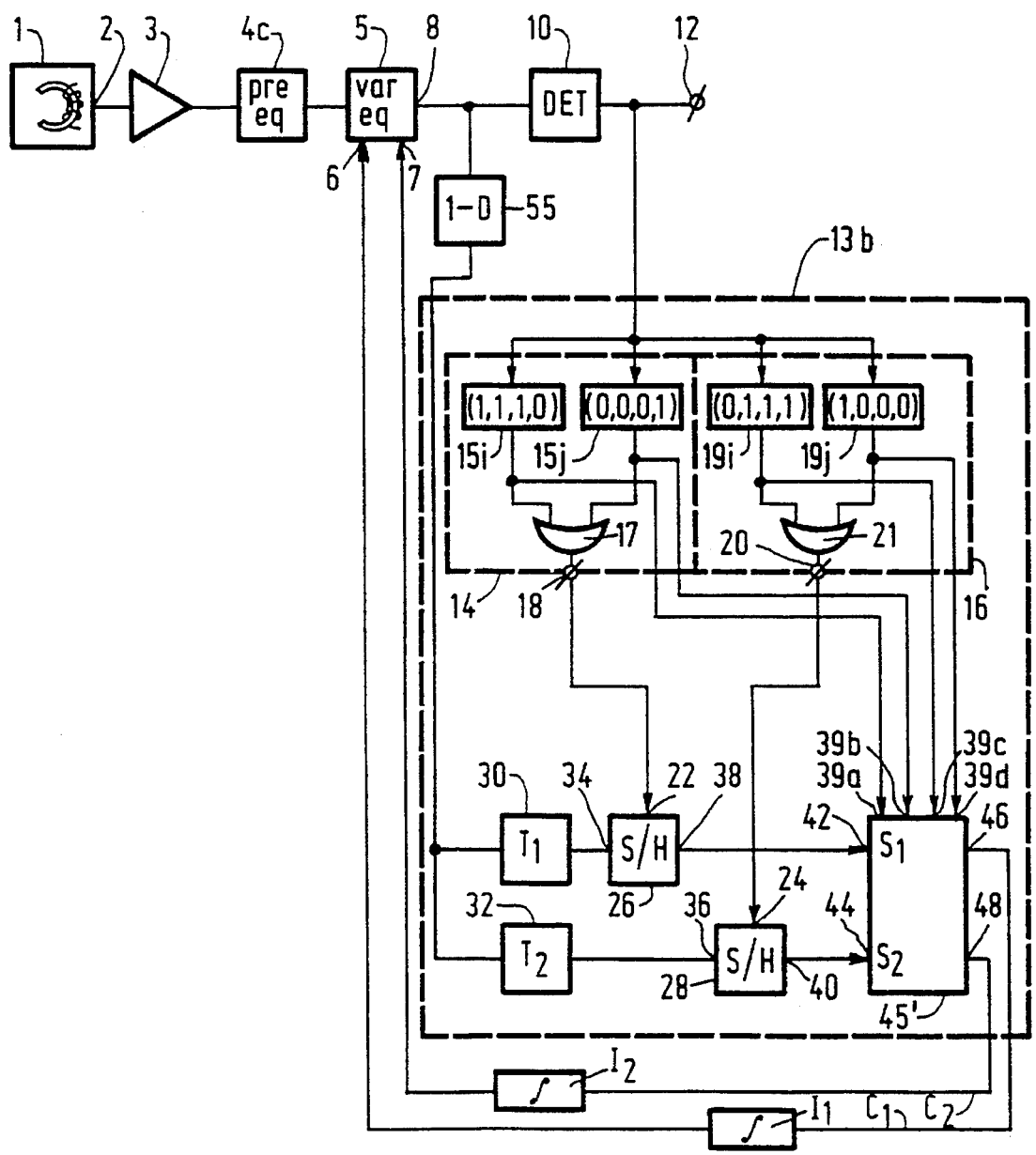
FIG. 22 shows a second embodiment of a reproducing arrangement for carrying out a full response detection.

FIG. 22 shows another embodiment in which a full response detection is carded out on the signal read out from tape. The selection of the required bit sequences is realized by using the digital signal available at the output terminal 12. For that purpose, the circuit 13b in FIG. 22 is provided with selector stages 15i, 15j, 19i and 19j for selecting the bit sequences (1,1,1,0), (0,0,0,1), (0,1,1,1) and (1,0,0,0) respectively.

When the bit sequence (0,0,0,1) has been selected, the selector stage 15j generates a selection signal which is applied to the sample-and-hold circuit 26, via the OR-gate 17. The selection of the (0,0,0, 1) bit sequence means that a positive going step transition as per FIG. 18a has been detected. Upon receipt of the selection signal, the sample-and-hold circuit 26 samples the signal applied to its input at the time interval t=−τ in FIG. 18d.

When the bit sequence (1,1,1,0) has been selected, the selector stage 15i generates a selection signal which is applied to the sample-and-hold circuit 26, via the OR-gate 17. The selection of the (1,1,1,0) bit sequence means that a negative going step transition has been detected. Upon receipt of the selection signal, the sample-and-hold circuit 26 samples the signal applied to its input at the time interval t=−τ in FIG. 18d, assuming the transition in FIG. 18a would have been a negative going transition.

When having selected the bit sequence (0,1,1,1) has been selected, the selector stage 19i generates a selection signal which is applied to the sample-and-hold circuit 28, via the OR-gate 21. The selection of the (0,1,1,1) bit sequence means that a positive going step transition as per FIG. 18a has been detected. Upon receipt of the selection signal, the sample-and-hold circuit 28 samples the signal applied to its input at the time interval t=τ in FIG. 18d.

When the bit sequence (1,1,1,0) has been selected, the selector stage 19j generates a selection signal which is applied to the sample-and-hold circuit 28 via the OR-gate 21. The selection of the (1,1,1,0) bit sequence means that a negative going step transition has been detected. Upon receipt of the selection signal, the sample-and-hold circuit 28 samples the signal applied to its input at the time interval t=τ in FIG. 18d.

In the same way as described with reference to FIG. 11a, the control signal generator 45' generates the first and second control signal $c_1$ and $c_2$ in response to the sample values applied to the inputs 42 and 44, and in response to the selection signals applied to the inputs 39a to 39d.

A further embodiment of a full response detection system will be described with reference to FIGS. 23a–23d shows a transition in the write current after being read out. The four subsequent signal samples in the read-out signal that adjoin the transition are denoted by $a_1$ to $a_4$. The sample value $s_1$ discussed up till now in fact equals $a_2-a_1$, and the sample value $s_2$ discussed up till now in fact equals $a_4-a_3$.

Consequently, the first control signal $c_1$ equals $(a_2-a_1)+(a_4-a_3)$ and the second control signal $c_2$ equals $(a_2-a_1)-(a_4-a_3)$. In the case of a negative going transition, the signs of the values for $c_1$ and $c_2$ obtained by means of the above formula should be reversed.

The value for $c_2$ can be obtained in a different way, namely by means of the formula $c_2=a_2+a_3$. This formula can easily be obtained from the formula for $c_2$ given previously by leaving the terms $a_1$ and $a_4$ out, which is acceptable as the values for those samples can be considered equal in amplitude. FIG. 23b, which show the situation of FIG. 18e and FIG. 23c, which show the situation of FIG. 19b, make clear that both formulae for $c_2$ give the same result.

Figure 24:
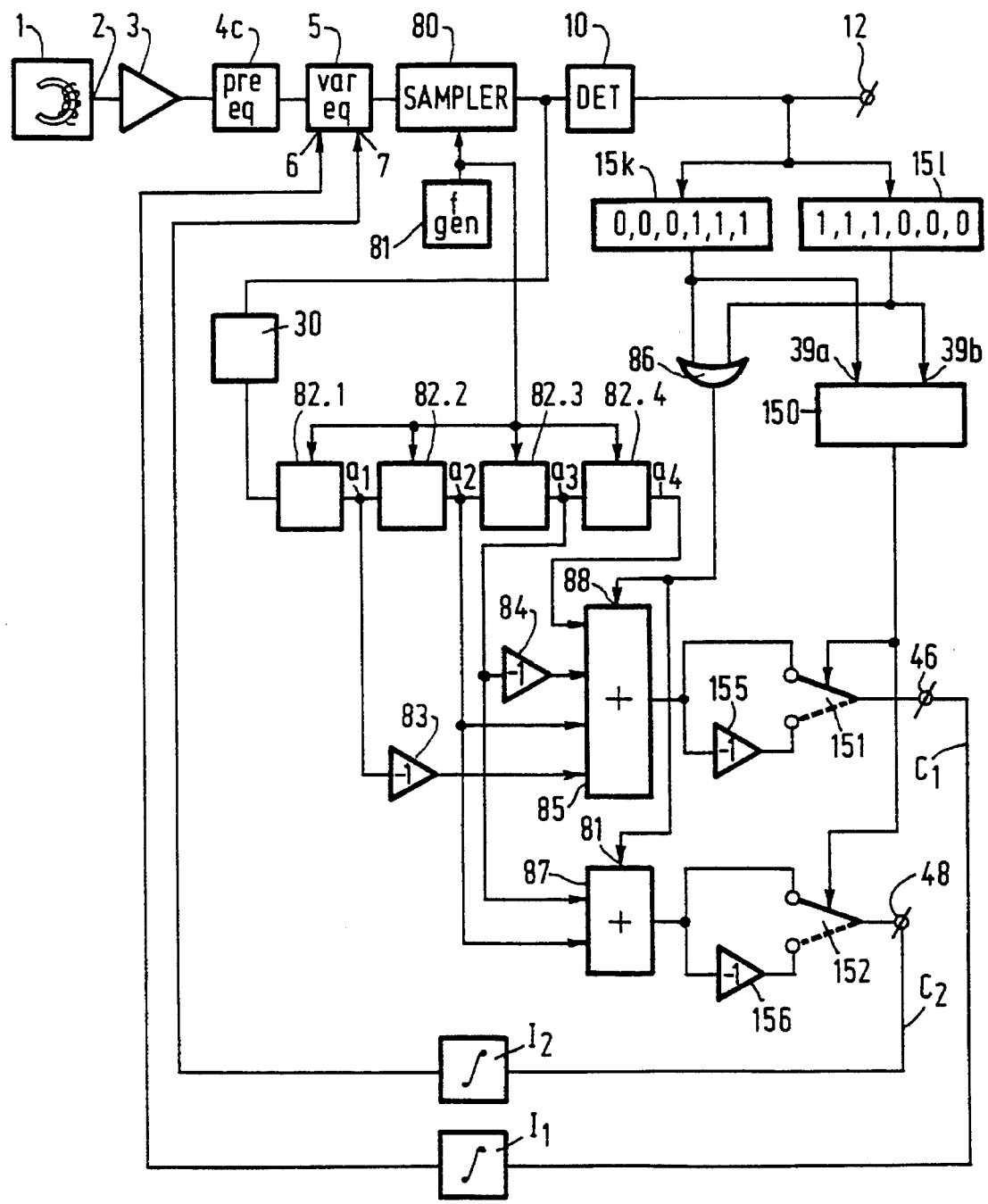
FIG. 24 shows a third embodiment using full response detection.

FIG. 24 shows an embodiment which is based on the above knowledge. Sampler 80 coupled to the output of the variable equalizer 5 samples the analog signal so as to obtain the samples . . . , $a_1, a_2, a_3, a_4, \ldots$ The sampling frequency is supplied by a sampling frequency generator 81. The samples are supplied to a shift register comprising four memory stages 82.1 to 82.4, and are shifted into the shift register with the same sampling frequency supplied by the frequency generator 81. The output of the memory stage 82.1 is coupled to a first input of an adder circuit 85 via a signal inverter unit 83. The output of the memory stage 82.2 is coupled to a second input of the adder circuit 85, as well as to a first input of an adder circuit 87. The output of the memory stage 82.3 is coupled to a second input of the adder circuit 87, as well as via an inverter stage 84 to a third input of the adder circuit 85. The output of the memory stage 82.4 is coupled to a fourth input of the adder circuit 85.

Selector circuits 15k and 15l are present to select the arrays of bits (0,0,0,1,1,1) and (1,1,1,0,0,0) respectively in the output signal of the detector 10. Outputs of the selector circuits 15k and 15l are coupled to the inputs 39a and 39b respectively of the switching signal generator 150, extensively discussed with reference to FIG. 6a. Further, the outputs of the selection circuits 15k and 15l are coupled to an OR-gate 86, an output of which is coupled to control inputs 88 and 89 of the adder circuits 85 and 87 respectively.

Figure 23A:
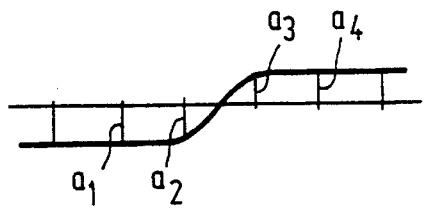
FIGS. 23a–23d set forth explanatory drawings of signals occurring in a full response detection system.
Figure 23B:
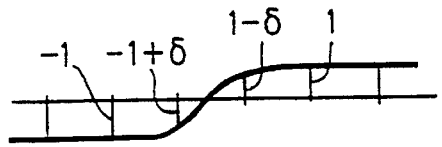

As soon as the bit array (0,0,0,1,1,1) has been selected by the selector 15k, which means that the situation shown in FIG. 23a occurs, a selection signal is generated at the output of the selection circuit 15k. It is assumed that the delay 30 is such that the shift register 82 has the samples $a_1$ to $a_4$ of FIG. 23a stored in the respective memory stages 82.1 to 82.4. This selection signal is applied to the adder circuits 85 and 87 via the OR-gate 86, so as to activate an adding step in the two adding circuits. Under the influence of the selection signal applied to the control input 88, the adder circuit 85 calculates $c_1$ in accordance with the formula given in FIG. 23a. Under the influence of the selection signal applied to the control input 89, the adder circuit 87 calculates $c_2$ in accordance with the simplified formula given in FIG. 23a. Under the influence of the selection signal applied to input 39a, the switching control circuit 150 controls the switches into the positions as shown in FIG. 24.

In the situation of an isolated negative going transition, the selector circuit 151 will generate a selection signal, which results in the switches 151 and 152 to be switched to their 'down' positions.

A further formula for deriving the control signal $c_2$ is: $a_1+a_2+a_3+a_4$. This follows more or less directly from FIG. 23d. The top curve in FIG. 23d is the impulse response, and the lower curve in FIG. 23d is the corresponding step response obtained in a full response detection method.

Copying the method as explained previously for the impulse response curve, means that the deviation of the step response detected from an ideal step response should be determined on time instants lying half way between the sampling moments in the full response detection method. This deviation is called $ISI_{lead}$ and $ISI_{lag}$. $ISI_{lead}$ equals $A+(a_1+a_2)/2$, and $ISI_{lag}$ equals $A-(a_3+a_4)/2$, so that $c_2$ equals $ISI_{lead}-ISI_{lag}$, which is proportional to the sum of all four sample values $a_1$ to $a_4$.

Figure 23D:
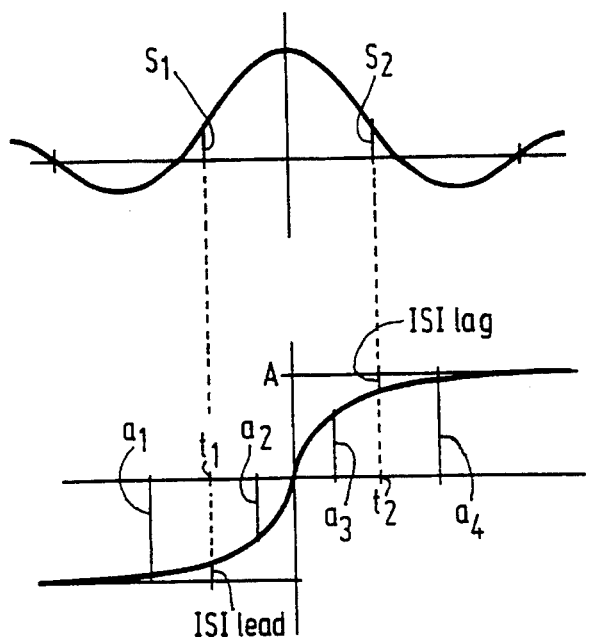
Figure 23C:
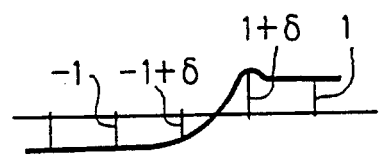

It might of course be possible to sample the signal on time instants indicated by $t_1$ and $t_2$ in FIG. 23d so as to obtain $c_1$ and/or $c_2$.

From the foregoing description it has become clear that the invention is based on determining the difference between an actual response in the signal received and the corresponding ideal response. This difference is a measure for the non-ideal character of the transmission channel, and can be used for deriving the two control signals for controlling a variable equalizer.

The invention, thus far described, has shown a zero-forcing equalization, in which the sample values at time instants neighboring the time instant(s) of occurrence of the peak amplitude(s), see FIGS. 7f, 8f, 9f and 10f for the Nyquist-1 situation and FIG. 15f and 16f for the partial response class IV situation, are controlled to a zero amplitude. This means that the intersymbol interference (ISI) at those time instants becomes zero.

In some cases however, it can be useful to accept a certain amount of ISI, as the detection error rate in the detected digital signal appears to be the lowest for that amount of ISI, and not for ISI equal to zero.

The equalization mechanism described previously can be used for realizing an adaptive equalization that results in a controlled ISI at the time instants in question, such that the ISI is independent of the amplitude of the neighbouring peak.

A number of examples will be given as to how the two control signals for the frequency correction and the phase correction respectively can be obtained.

Figure 25:
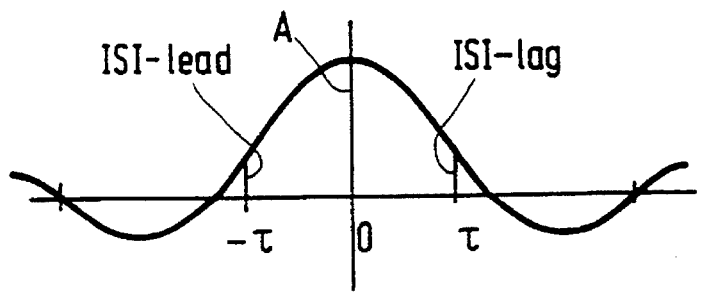
FIGS. 25 and 26 set forth further explanatory drawings of isolated impulses.

FIG. 25 shows an isolated pulse obtained by a Nyquist-1 detection system. Now, not only the signal values ISI-lead and ISI-lag at the time instants $t=-\tau$ and $t=\tau$ are taken, but also the signal value A at $t=0$. The error signal for the frequency control is now as follows:

$$HF\text{-error}=(ISI\text{-lead}+ISI\text{-lag})-b.A,$$

where b is a value of allowed intersymbol interference relative to the amplitude of the pulse. In this way a certain amount of ISI remains after equalization, as a result of a too low HF-equalization. If an additional HF-equalization is required for the remaining ISI, b should be taken negative.

Further, the error signal for the phase control is now as follows:

$$\text{phase-error}=(ISI\text{-lead}-ISI\text{-lag})-b.A.$$

In this way, a certain amount of ISI remains after equalization, as a result of a residual phase shift.

Both error signals are applied to the integrators $I_1$ and $I_2$ so as to obtain the control signals for the variable equalizer. Further, as explained earlier, ISI-lead and ISI-lag can be determined from single (0,0,1) and (0,0,-1), and (1,0,0) and (-1,0,0) arrays respectively.

Figure 26:
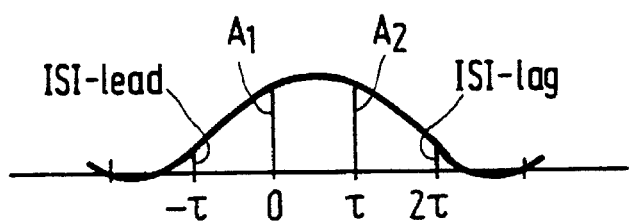

FIG. 26 shows an isolated pulse obtained by a partial-response class IV detection system. Now, not only the signal values ISI-lead and ISI-lag at the time instants $t=-\tau$ and $t=2\tau$ are taken, but also the signal values $A_1$ at $t=0$ and $A_2$ at $t=\tau$.

The error signal for the frequency control is now as follows:

$$HF\text{-error} = (ISI\text{-lead} - b.A_1) + (ISI\text{-lag} - b.A_2),$$

$$\text{phase-error} = (ISI\text{-lead} - b.A_1) - (ISI\text{-lag} + b.A_{2l})$$

Both error signals are applied to the integrators $I_1$ and $I_2$ so as to obtain the control signals for the variable equalizer.

Figure 27:
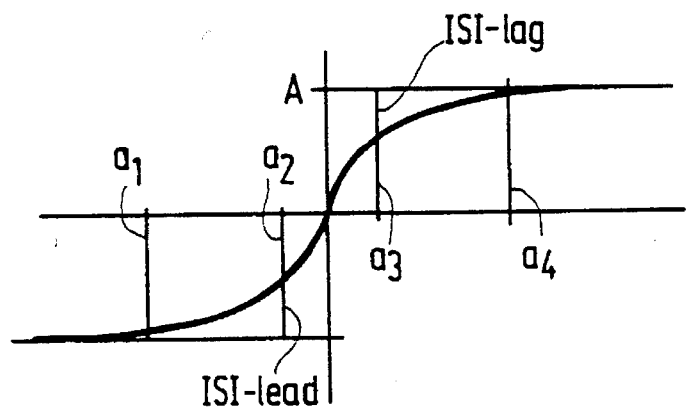
FIG. 27 set forth an explanatory drawing of an isolated step transition.

FIG. 27 shows a step transition obtained in the full-response situation. Going out from the values $a_1$ to $a_4$, the error signals can be derived as follows:

$$HF\text{-error} = (a_2 - a_1) + (a_4 - a_3) - b.(a_3 - a_2),$$

$$\text{phase-error} = (a_1 + a_2) + (a_3 + a_4) - b.(a_3 - a_2)$$

The amplitude term, characterized by the term $a_3 - a_2$, can preferably be replaced by $a_4 - a_1$, so as to obtain a better approximation for the amplitude term. Further, preferably the error signals are normalized by dividing the error signals given above by the amplitude value.

We claim:

1. An arrangement for producing a digital signal from an input signal obtained from a transmission medium, the arrangement comprising:

variable equalizer means for producing an equalized signal from the input signal on the basis of a first control signal and a second control signal;

signal detector means for producing the digital signal from the equalized signal;

control signal generator means for generating the first control signal and the second control signal on the basis of a first sample value and a second sample value, the first control signal being derived in whole or in part from a first arithmetical combination of the first sample value and the second sample value, and the second control signal being derived in whole or in part from a second arithmetical combination of the first sample value and the second sample value, one of the first arithmetical combination and second arithmetical combination being the sum of the first sample value and the second sample value, and the other of the first arithmetical combination and second arithmetical combination being the difference between the first sample value and the second sample value;

bit sequence detector means for generating (a) a first selection signal upon detection of a first bit sequence in the digital signal and (b) a second selection signal upon detection of a second bit sequence in the digital signals the first bit sequence corresponding to a first signal portion of the equalized signal and the second bit sequence corresponding to a second signal portion of the equalized signal; and sample-and-hold means for producing the first sample value and the second sample value, said sample-and-hold means being adapted to (a) sample the first signal portion in response to the first selection signal so as to produce the first sample value and (b) sample the second signal portion in response to the second selection signal so as to produce the second sample value.

2. The arrangement as claimed in claim 1, wherein the digital signal is a two valued digital signal, the first bit sequence (a) begins with at least two '0'-bits and ends with at least one '1'-bit or (b) beings with at least two '1'-bits and ends with at least one '0'-bit, and the second bit sequence (c) begins with at least one '1'-bit and ends with at least two '0'-bits or (d) begins with at least one '0'-bits and ends with at least two '1'-bits.

3. The arrangement as claimed in claim 2, wherein the first bit sequence is either (1,1,1,0) or (0,0,0,1), and the second bit sequence is either (1,0,0,0) or (0,1,1,1).

4. The arrangement as claimed in claim 3, wherein said sample-and-hold means is further adapted to (a) sample the first signal portion at a first time instant and a second time instant so as to produce a first first sample value and a second first sample value, the first time instant corresponding to a time instant in which the third bit from the right in the first bit sequence occurs and the second time instant corresponding to a time instant in which the second bit from the right in the first bit sequence occurs; and (b) sample the second signal portion at a third time instant and a fourth time instant so as to produce a first second sample value and a second second sample value, the third time instant corresponding to a time instant in which the second bit from the left in the second bit sequence occurs and the fourth time instant corresponding to a time instant in which the third bit from the left in the second bit sequence occurs.

5. The arrangement as claimed in claim 4, wherein the second control signal is derived from the sum of the second first sample value and the first second sample value.

6. The arrangement as claimed in claim 4, wherein the second control signal is derived from the sum of the first first sample value, the second first sample value, the first second sample value and the second second sample value.

7. The arrangement as claimed in claim 4, wherein the first control signal is derived from the sum of the second first sample value and the second second sample value less the sum of the first first sample value and the first second sample value.

8. The arrangement as claimed in claim 4, wherein the second control signal is derived from the sum of the second first sample value and the first second sample value less the sum of the first first sample value and the second second sample value.

9. The arrangement as claimed in claim 3, wherein said sample-and-hold means is further adapted to (a) sample the first signal portion at a first time instant and a second time instant so as to produce a first first sample value and a second first sample value, the first time instant corresponding to a time instant lying between time instants in which the fourth bit and the third bit from the right in the first bit sequence occur and the second time instant corresponding to a time instant lying between time instants in which the third bit and the second bit from the right in the first bit sequence occur; and (b) sample the second signal portion at a third time instant and a fourth time instant so as to produce a first second sample value and a second second sample value, the third time instant corresponding to a time instant lying between time instants in which the second bit and the third bit from the left in the second bit sequence occur and the fourth time instant corresponding to a time instant lying between time instants in which the third bit and the fourth bit from the left in the second bit sequence occur.

10. The arrangement as claimed in claim 9, wherein the second control signal is derived from the sum of the second first sample value and the first second sample value.

11. The arrangement as claimed in claim 9, wherein the second control signal is derived from the sum of the first first sample value, the second first sample value, the first second sample value and the second second sample value.

12. The arrangement as claimed in claim 9, wherein the first control signal is derived from the sum of the second first sample value and the second second sample value less the sum of the first first sample value and the first second sample value.

13. The arrangement as claimed in claim 9, wherein the second control signal is derived from the sum of the second first sample value and the first second sample value less the sum of the first first sample value and the second second sample value.

14. The arrangement as claimed in claim 1, wherein the digital signal is a two valued digital signal, and the second bit sequence (a) begins with at least one '1'-bit and ends with at least two '0'-bits or (b) begins with at least one '0'-bit and ends with at least two '1'-bits.

15. The arrangement as claimed in claim 14, wherein the second bit sequence is either (1,0,0,0) or (0,1,1,1).

16. The arrangement as claimed in claim 15, wherein said sample-and-hold means is further adapted to sample the second signal portion at a first time instant and a second time instant so as to produce a first second sample value and a second second sample value, the first time instant corresponding to a time instant in which the second bit from the left in the second bit sequence occurs and the second time instant corresponding to a time instant in which the third bit from the left in the second bit sequence occurs.

17. The arrangement as claimed in claim 15, wherein said sample-and-hold means is further adapted to sample the second signal portion at a first time instant and a second time instant so as to produce a first second sample value and a second second sample value, the first time instant corresponding to a time instant lying between time instants in which the second bit and the third bit from the left in the second bit sequence occur and the second time instant corresponding to a time instant lying between time instants in which the third bit and the fourth bit from the left in the second bit sequence occur.

18. The arrangement as claimed in claim 1, wherein the first arithmetical combination is the sum of the first sample value and the second sample value, and the second arithmetical combination is the difference between the first sample value and the second sample value.

19. The arrangement as claimed in claim 18, wherein said variable equalizer means has a magnitude response and a phase response, and said variable equalizer means is adapted to vary the magnitude response as a function of frequency in response to the first control signal and to vary the phase response as a function of frequency in response to the second control signal.

20. The arrangement as claimed in claim 19, wherein said variable equalizer means further has an operating frequency range, and said variable equalizer means is further adapted to (a) vary the magnitude response in a high frequency region of the operating frequency range in relation to the magnitude response of a low frequency region in the operating frequency range in response to the first control signal so that the sum of a subsequent first sample value and a subsequent second sample value is substantially zero, and (b) vary the phase response in the high frequency region in relation to the phase response in the low frequency region in response to the second control signals, that the difference between the subsequent first sample value and the subsequent second sample value is substantially zero.

21. The arrangement as claimed in claim 18, wherein the digital signal is a three valued digital signal and the first bit begins with at least one '0'-bit and ends with at least one '1'-bit or '−1'-bit.

22. The arrangement as claimed in claim 8, wherein the digital signal is a three valued digital signal and the second bit sequence begins with at least one '1'-bit or '−1'-bit and ends with at least one '0'-bit.

23. The arrangement as claimed in claim 1, wherein the digital signal, is a three valued digital signal and the first bit sequence begins with at least one '0'-bit and ends with at least one '1'-bit or '−1'-bit.

24. The arrangement as claimed in claim 23, wherein the first bit sequence is either (0,0,1) or (0,0,−1).

25. The arrangement as claimed in claim 24, wherein said sample-and-hold means is further adapted to sample the first signal portion at a time instant which corresponds to a time instant which lies between time instants in which two neighboring '0'-bits directly adjoining the '1'-bit or '−1'-bit in the first bit sequence occur so as to produce the first sample value.

26. The arrangement as claimed in claim 23, wherein the first bit sequence is either (0,0,1,1) or (0,0,−1,−1).

27. The arrangement as claimed in claim 26, wherein said sample-and-hold means is further adapted to sample the first signal portion at a time instant which corresponds to a time instant which lies between time instants in which two neighboring '0'-bits directly adjoining the '1'-bit or '−1'-bit in the first bit sequence occur so as to produce the first sample value.

28. The arrangement as claimed in claim 23, wherein said sample-and-hold means is further adapted to sample the first signal portion at a time instant which corresponds to time instant in which the '0'-bit directly adjoining the '1'-bit or '−1'-bit in the first bit sequence occurs so as to produce the first sample value.

29. The arrangement as claimed in claim 1, wherein the digital signal is a three valued digital signal and the second bit sequence begins with at least one '1'-bit or '−1'-bit and ends with at least one '0'-bit.

30. The arrangement as claimed in claim 29, wherein the second bit sequence is either (1,0,0) or (−1,0,0).

31. The arrangement as claimed in claim 30, wherein said sample-and-hold means is further adapted to sample the second signal portion at a time instant which corresponds to a time instant which lies between time instants in which the two neighboring '0'-bits directly adjoining the '1'-bit or '−1-bit in the second bit sequence occur so as to produce the second sample value.

32. The arrangement as claimed in claim 29, wherein the second bit sequence is either (1,1,0,0) or (−1,−1,0,0).

33. The arrangement as claimed in claim 32, wherein said sample-and-hold means is further adapted to sample the second signal portion at a time instant which corresponds to a time instant which lies between time instants in which the two neighboring '0'-bits directly adjoining the '1'-bit or '−1-bit in the second bit sequence occur so as to produce the second sample value.

34. The arrangement as claimed in claim 29, wherein said sample-and-hold means is further adapted to sample the second signal portion at a time instant which corresponds to a time instant in which the '0'-bit directly adjoining the '1'-bit or '−1'-bit in the second bit sequence occurs so as to produce the second sample value.

35. The arrangement as claimed in claim 1, wherein the digital signal, is a two valued digital signal and the first bit sequence (a) begins with at least two '0'-bits and ends with at least one '1'-bit or (b) begins with at least two '1'-bits and ends with at least one '0'-bit.

36. The arrangement as claimed in claim 35, wherein the first bit sequence is either (1,1,1,0) or (0,0,0,1).

37. The arrangement as claimed in claim 36, wherein said sample-and-hold means is further adapted to sample the first signal portion at a first time instant and a second time instant so as to produce a first first sample value and a second first sample value, the first time instant corresponding to a time instant in which the third bit from the right in the first bit sequence occurs and the second time instant corresponding to a time instant in which the second bit from the right in the first bit sequence occurs.

38. The arrangement as claimed in claim 36, wherein said sample-and-hold means is further adapted to sample the first signal portion at a first time instant and a second time instant so as to produce a first first sample value and a second first sample value, the first time instant corresponding to a time instant lying between time instants in which the fourth bit and the third bit from the right in the first bit sequence occur and the second time instant corresponding to a time instant lying between time instants in which the third bit and the second bit from the right in the first bit sequence occur.

39. The arrangement as claimed in claim 1, wherein said variable equalizer means has a magnitude response and a phase response, and said variable equalizer means is adapted to vary the magnitude response as a function of frequency in response to the first control signal and to vary the phase response as a function of frequency in response to the second control signal.

40. The arrangement as claimed in claim 39, wherein said variable equalizer means further has an operating frequency range, and said variable equalizer means is further adapted to (a) vary the magnitude response in a high frequency region of the operating frequency range in relation to the magnitude response in a low frequency region in the operating frequency range in response to the first control signal so that the sum of a subsequent first sample value and a subsequent second sample value is substantially zero and (b) vary the phase response in the high frequency region in relation to the phase response in the low frequency region in response to the second control signal so that the difference between the subsequent first sample value and the subsequent second sample value is substantially zero.

41. The arrangement as claimed in claim 1, wherein the first signal portion includes a transition in the equalized signal from a first signal value, to a second signal value and the second signal portion includes a transition in the equalized signal from the second signal value to the first signal value.

42. The arrangement as claimed in claim 41, wherein the digital signal is a three valued digital signal and the first bit sequence begins with at least one '0'-bit and ends with at least one '1'-bit or '−1'-bit.

43. The arrangement as claimed in claim 41, wherein the digital signal is a three valued digital signal and the second bit sequence begins with at least one '1'-bit or '−1'-bit and ends with at least one '0'-bit.

44. The arrangement as claimed in claim 1, wherein said sample-and-hold means is further adapted to produce a plurality of first sample values in response to the first selection signal and a plurality of second sample values in response to the second selection signal, and said control signal generator means is adapted to generate the first control signal and the second control signal on the basis of the first sample values and the second sample values.

45. The arrangement as claimed in claim 1, wherein the first control signal is derived in whole from the first arithmetical combination, and the second control signal is derived in whole from the second arithmetical combination.

* * * * *